United States Patent
Kanno

(10) Patent No.: US 10,913,366 B2
(45) Date of Patent: Feb. 9, 2021

(54) ELECTRODE UNIT, POWER TRANSMITTING DEVICE, POWER RECEIVING DEVICE, ELECTRONIC DEVICE, VEHICLE, AND WIRELESS POWER TRANSMISSION SYSTEM

(71) Applicant: Panasonic Intellectual Property Management Co., Ltd., Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 202 days.

(21) Appl. No.: 16/035,613

(22) Filed: Jul. 14, 2018

(65) Prior Publication Data
US 2019/0027974 A1 Jan. 24, 2019

(30) Foreign Application Priority Data

Jul. 20, 2017 (JP) ................... 2017-140582
Mar. 26, 2018 (JP) ................... 2018-058114

(51) Int. Cl.
*H02J 50/70* (2016.01)
*H02J 50/05* (2016.01)
(Continued)

(52) U.S. Cl.
CPC ............... *B60L 53/00* (2019.02); *B60L 53/53* (2019.02); *H02J 7/0042* (2013.01); *H02J 7/025* (2013.01); *H02J 50/05* (2016.02); *H02J 50/70* (2016.02)

(58) Field of Classification Search
CPC .......... H02J 50/70; H02J 7/0042; H02J 50/05; H02J 7/025; B60L 53/00; B60L 53/53
See application file for complete search history.

(56) References Cited

U.S. PATENT DOCUMENTS

| | | | |
|---|---|---|---|
| 2009/0054784 A1* | 2/2009 | Okuda | G01S 7/521 600/459 |
| 2012/0038223 A1* | 2/2012 | Harakawa | H02J 5/005 307/109 |

(Continued)

FOREIGN PATENT DOCUMENTS

| | | |
|---|---|---|
| CA | 2288807 A1 | 9/1999 |
| JP | 11-259638 A | 9/1999 |

(Continued)

OTHER PUBLICATIONS

An Extended European Search Report dated Oct. 2, 2018 for a corresponding European patent application No. 18184011.7.

*Primary Examiner* — Rexford N Barnie
*Assistant Examiner* — Terrence R Willoughby
(74) *Attorney, Agent, or Firm* — Renner, Otto, Boisselle & Sklar, LLP

(57) ABSTRACT

An electrode unit is for use in a power transmitting device or a power receiving device of a wireless power transmission system based on an electric field coupling method. The electrode unit includes; a first group of electrodes including a plurality of first electrodes to which a first voltage is applied when power is transmitted; and a second group of electrodes including a plurality of second electrodes to which a second voltage is applied when power is transmitted, wherein the second voltage has a phase that is different from a phase of the first voltage by a value greater than 90 degrees and less than 270 degrees. The plurality of first electrodes and the plurality of second electrodes are arranged in a first direction along an electrode installation surface. At least two of the plurality of first electrodes and at least two of the plurality of second electrodes are arranged alternating with each other in the first direction.

14 Claims, 24 Drawing Sheets

(51) Int. Cl.
*H02J 7/02* (2016.01)
*B60L 53/00* (2019.01)
*H02J 7/00* (2006.01)
*B60L 53/53* (2019.01)

(56) References Cited

U.S. PATENT DOCUMENTS

| | | | |
|---|---|---|---|
| 2014/0152122 A1 | 6/2014 | Ichikawa | |
| 2014/0175906 A1 | 6/2014 | Suesada et al. | |
| 2015/0249366 A1 | 9/2015 | Takikawa et al. | |
| 2015/0372505 A1 | 12/2015 | Takahashi | |
| 2017/0063144 A1* | 3/2017 | Spinella | H02J 50/12 |
| 2019/0273402 A1* | 9/2019 | Niizuma | H02J 50/60 |

FOREIGN PATENT DOCUMENTS

| | | |
|---|---|---|
| JP | 2008-310818 A | 12/2008 |
| JP | 2010-193692 A | 9/2010 |
| JP | 2012-175869 A | 9/2012 |
| WO | 2008/157253 A1 | 12/2008 |
| WO | 2013/168307 A1 | 11/2013 |
| WO | 2014/049750 A1 | 4/2014 |
| WO | 2014/132518 A1 | 9/2014 |
| WO | 2016/017750 A1 | 2/2016 |
| WO | 2016/159313 A1 | 10/2016 |

* cited by examiner

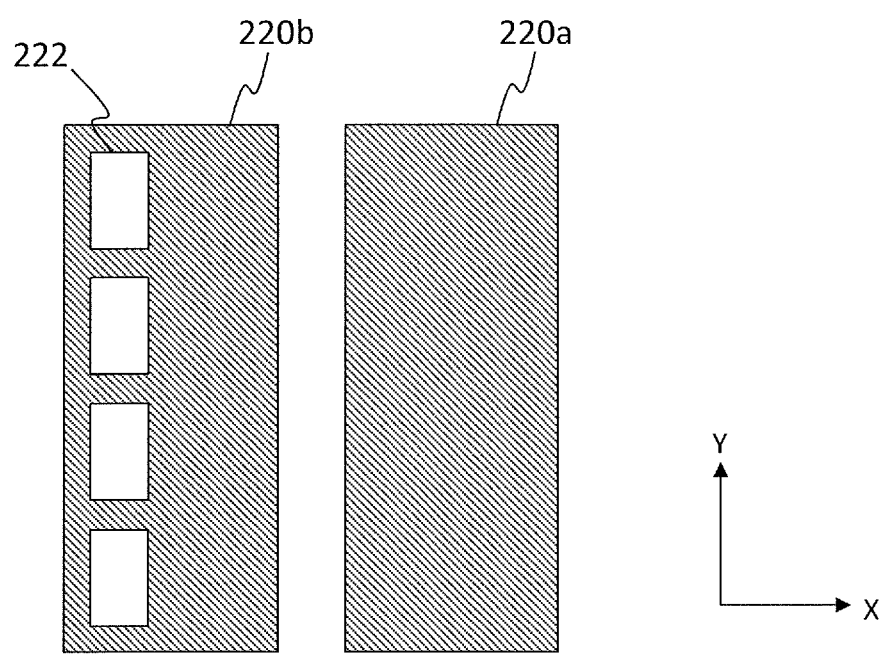

ELECTRODE UNIT, POWER TRANSMITTING DEVICE, POWER RECEIVING DEVICE, ELECTRONIC DEVICE, VEHICLE, AND WIRELESS POWER TRANSMISSION SYSTEM

BACKGROUND

1. Technical Field

The present disclosure relates to an electrode unit, a power transmitting device, a power receiving device, an electronic device, a vehicle, and a wireless power transmission system.

2. Description of the Related Art

In recent years, wireless power transmission techniques have been developed for transmitting electric power wirelessly, i.e., in a contactless manner, to devices that are capable of moving or being moved, e.g., mobile phones and electric vehicles. The wireless power transmission techniques include methods based on electromagnetic induction and methods based on electric field coupling. Among these, a wireless power transmission system based on the electric field coupling method is such that. AC power is transferred wirelessly from a pair of power transmitting electrodes to a pair of power receiving electrodes, with the pair of power transmitting electrodes and the pair of power receiving electrodes opposing each other. For example, such a wireless power transmission system based on the electric field coupling method is used in applications where electric power is transferred to a load from a pair of power transmitting electrodes on or under a road surface or a floor surface. Japanese Laid-open Patent Publication No. 2010-193692 discloses an example of such a wireless power transmission system based on the electric field coupling method.

SUMMARY

With conventional wireless power transmission based on the electric field coupling method, an electric field leakage may occur around the power transmitting electrodes or the power receiving electrodes, thereby causing nearby electronic devices to malfunction. The present disclosure provides a technique with which it is possible to suppress the electric field leakage around power transmitting electrodes or power receiving electrodes.

In order to solve the problem described above, an electrode unit according to an embodiment of the present disclosure is:

an electrode unit for use in a power transmitting device or a power receiving device of a wireless power transmission system based on an electric field coupling method, the electrode unit including:

a first group of electrodes including a plurality of first electrodes to which a first voltage is applied when power is transmitted; and a second group of electrodes including a plurality of second electrodes to which a second voltage is applied when power is transmitted, wherein the second voltage has a phase that is different from a phase of the first voltage by a value greater than 90 degrees and less than 270 degrees, the plurality of first electrodes and the plurality of second electrodes are arranged in a first direction along an electrode installation surface; and at least two of the plurality of first electrodes and at least two of the plurality of second electrodes are arranged alternating with each other in the first direction.

These general and specific aspects may be implemented using a system, a method, an integrated circuit, a computer program or a storage medium, or any combination of systems, devices, methods, integrated circuits, computer programs, and storage media.

With the technique of the present disclosure, it is possible to suppress the electric field leakage around power transmitting electrodes or power receiving electrodes, and reduce the risk of causing nearby electronic devices to malfunction.

These general and specific aspects may be implemented using a system, a method, and a computer program, and any combination of systems, methods, and computer programs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 23 is a diagram showing a variation of the configuration of FIG. 22.

FIG. 24B is a diagram showing another example of a configuration of a transparent region of a power receiving electrode.

DETAILED DESCRIPTION (Findings which are Basis of Present Disclosure)

Findings which are the basis of the present disclosure will be described before describing embodiments of the present disclosure.

Figure 1:
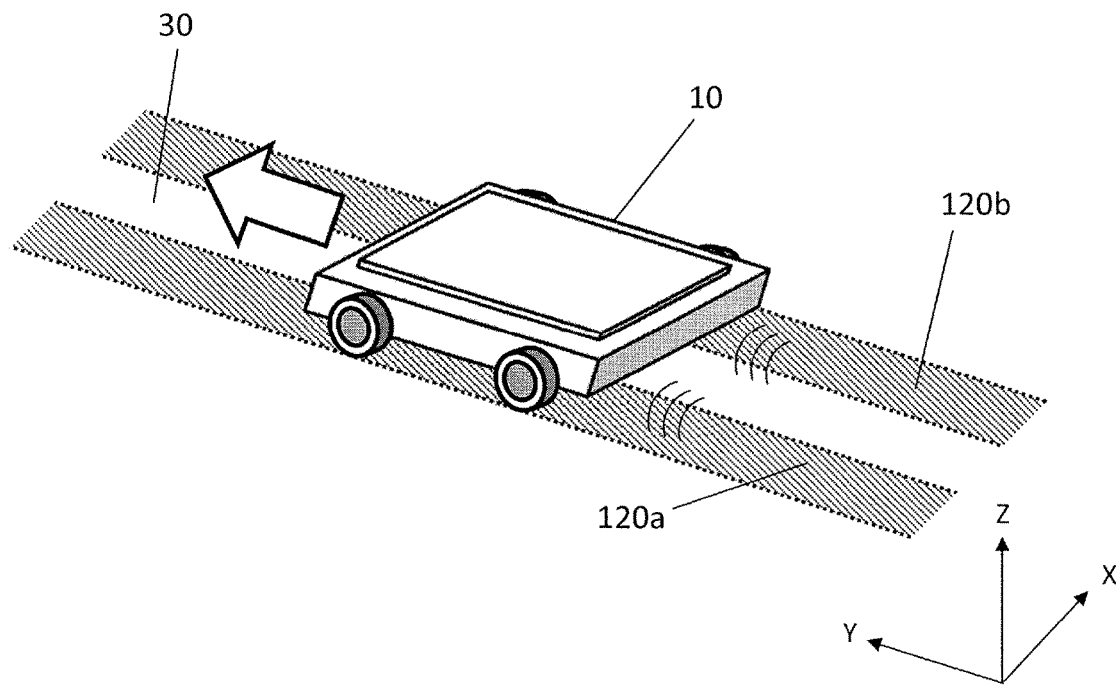
FIG. 1 is a diagram schematically showing an example of a wireless power transmission system based on the electric field coupling method.

FIG. 1 is a diagram schematically showing an example of a wireless power transmission system based on the electric field coupling method. The "electric field coupling method" refers to a method of power transmission in which electric power is wirelessly transmitted from a group of power transmitting electrodes including a plurality of power transmitting electrodes to a group of power receiving electrodes including a plurality of power receiving electrodes via an electric field coupling (hereinafter referred to also as "a capacitive coupling") between the group of power transmitting electrodes and the group of power receiving electrodes. The illustrated wireless power transmission system is a system for wirelessly transmitting electric power to a transport robot 10 such as an automated guided vehicle (AGV) used for transporting articles inside a factory, for example. In this system, a pair of flat plate-shaped power transmitting electrodes 120a and 120b are arranged on a floor surface 30. The transport robot 10 includes a pair of power receiving electrodes opposing the pair of power transmitting electrodes 120a and 120b. The transport robot 10 uses the pair of power receiving electrodes to receive AC power transmitted from the power transmitting electrodes 120a and 120b. The received power is supplied to a load of the transport robot 10, such as a motor, a secondary battery or a capacitor for storing electricity. Thus, the transport robot 10 is driven or charged.

FIG. 1 shows XYZ coordinates representing the X, Y and Z directions that are orthogonal to each other. The illustrated XYZ coordinates will be used in the following description. The Y direction denotes the direction in which the power transmitting electrodes 120a and 120b extend, the Z direction denotes the direction that, is perpendicular to the surface of the power transmitting electrodes 120a and 120b, and the X direction denotes the direction perpendicular to the Y direction and the Z direction. The X direction is the direction in which the power transmitting electrodes 120a and 120b are arranged next to each other. Note that the directions of structures shown in the figures of the present application are determined in view of the ease of understanding of the description herein, and they do not in any way limit directions to be used when actually carrying out any embodiment of the present disclosure. Also, the shape and size of the whole or part of any structure illustrated in the figures do not limit the actual shape and size thereof.

Figure 2:
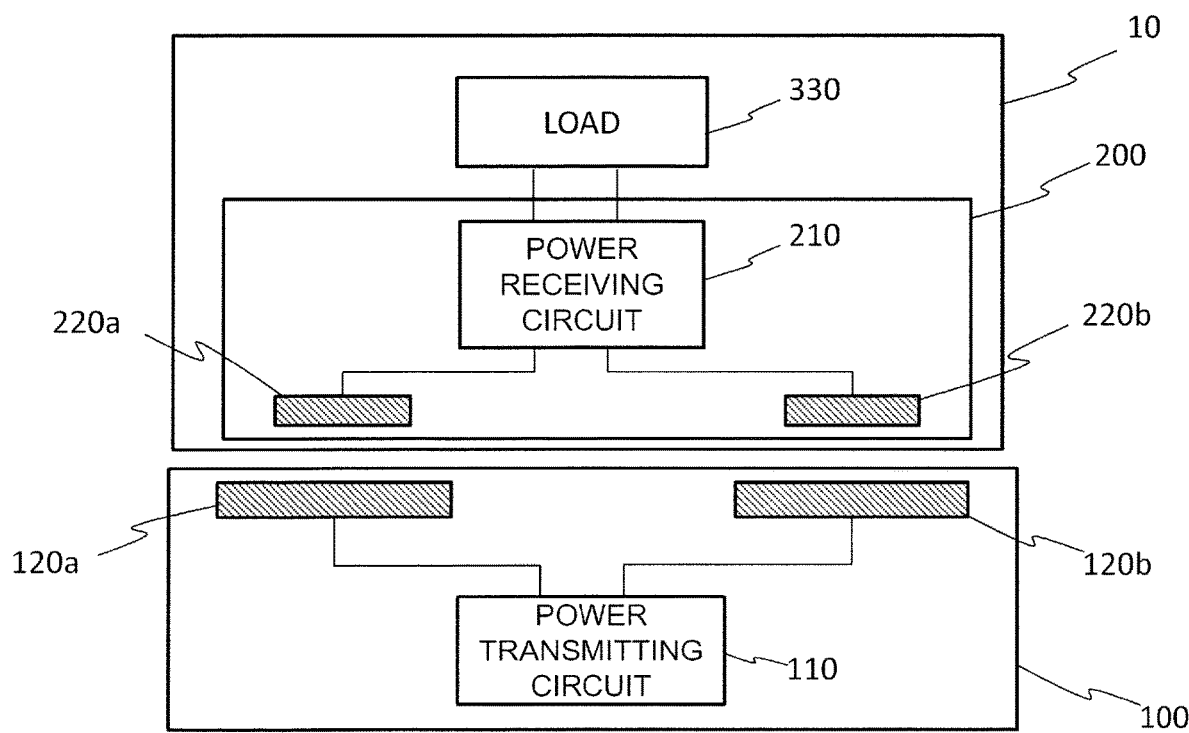
FIG. 2 is a diagram showing a general configuration of the wireless power transmission system shown in FIG. 1.

FIG. 2 is a diagram showing a general configuration of the wireless power transmission system shown in FIG. 1. The wireless power transmission system includes a power transmitting device 100 and the transport robot 10. The power transmitting device 100 includes the pair of power transmitting electrodes 120a and 120b, and the power-transmitting circuit 110 for supplying AC power to the power transmitting electrodes 120a and 120b. The power transmitting circuit 110 is an AC output circuit including an inverter circuit, for example. The power transmitting circuit 110 covers the DC power supplied from a DC power supply (not shown) to AC power, and outputs the AC power to the pair of power transmitting electrodes 120a and 120b. A matching circuit for reducing impedance mismatch may be inserted at a position preceding the application of AC-converted power to a power transmitting electrode.

The transport robot 10 includes a power receiving device 200 and a load 330. The power receiving device 200 includes a pair of power receiving electrodes 220a and 220b, and a power receiving circuit 210 for converting the AC power received by the power receiving electrodes 220a and 220b into a type of electric power that is required by the load 330 and supplying the converted power to the load 330. The power receiving circuit 210 may include various circuits such as a rectifier circuit or a frequency conversion circuit, for example. A matching circuit for reducing impedance mismatch may be inserted at a position preceding the output of the power received by the power receiving electrode to a rectifier circuit.

The load 330 is a component that consumes or stores electric power, such as a motor, a capacitor for storing electricity or a secondary battery, for example. Electric power is wirelessly transmitted between the pair of power transmitting electrodes 120a and 120b and the pair of power receiving electrodes 220a and 220b, while they oppose each other, via electric field coupling therebetween. The transmitted power is supplied to the load 330.

The power transmitting electrodes may be arranged so as to cross the floor surface rather than parallel to the floor surface. For example, when installed on a wall, etc., the power transmitting electrodes may be arranged substantially vertical to the floor surface. The power receiving electrodes of the vehicle may also be arranged so as to cross the floor surface so that the power receiving electrodes oppose the power transmitting electrodes. Thus, the arrangement of the power receiving electrodes is determined according to the arrangement of the power transmitting electrodes.

With such a wireless power transmission system based on the electric field coupling method, the capacitance between the power transmitting electrode and the power receiving electrode opposing each other is typically small. Therefore, when transmitting a large amount of electric power, a high voltage is applied to the power transmitting electrodes 120a and 120b. In such a case, the intensity of the electric field that leaks around the power transmitting electrodes 120a and 120b and the power receiving electrodes 220a and 220b also becomes high.

Figure 3:
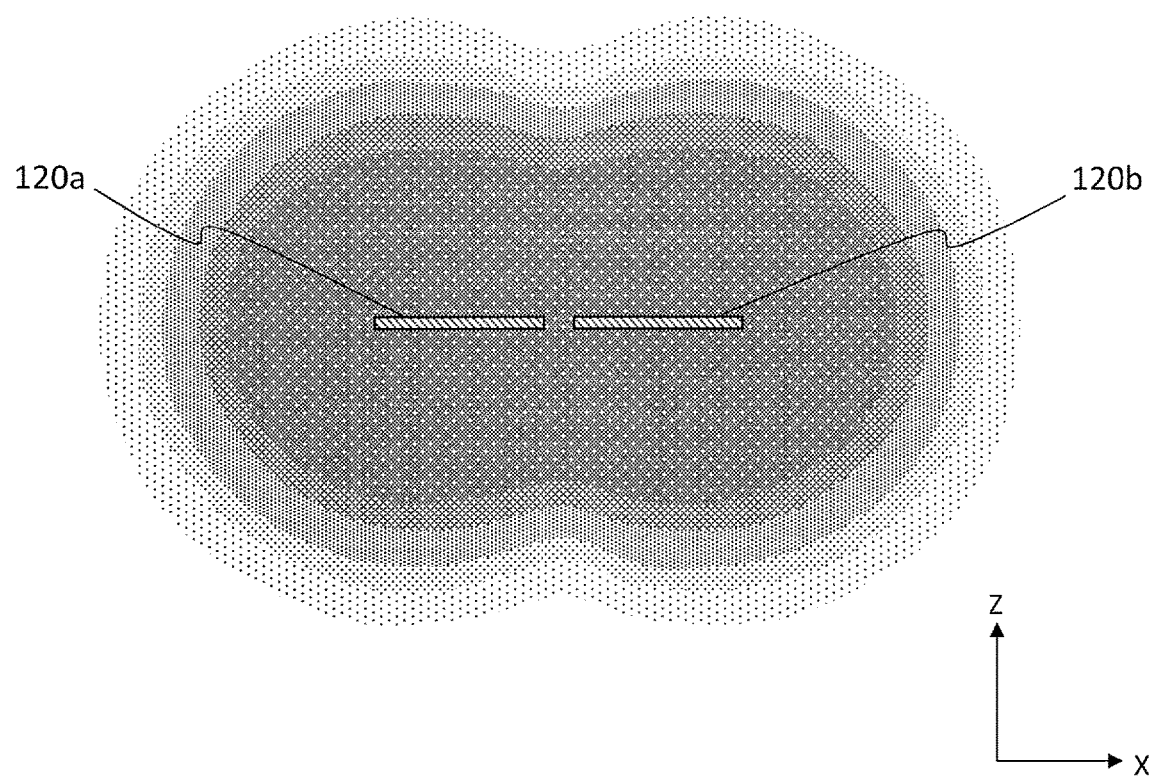
FIG. 3 shows an example of the distribution of an electric field formed around power transmitting electrodes 120a and 120b when transmitting power.

FIG. 3 shows an example of the distribution of an electric field formed around the power transmitting electrodes 120a and 120b when transmitting power. In FIG. 3, the darker the hatching, the higher the electric field intensity. In order to reduce the influence of electromagnetic: noise, etc., on an electronic device, it is desirable to reduce the extent of the area of high electric field intensity that is present around each electrode. For example, the electric field, intensity at a predetermined distance from each electrode is required not to exceed the immunity standard value determined for the electronic device. In view of biological safety, there may be a need to lower the leakage electric field intensity aiming at the reference level determined by International Commission on Non-Ionizing Radiation Protection (ICNIRP).

Based on the above findings, the present inventors arrived at embodiments of the present disclosure to be described below.

An electrode unit according to one embodiment of the present disclosure is:

an electrode unit for use in a power transmitting device or a power receiving device of a wireless power transmission system based on an electric field coupling method, the electrode unit including:

a first group of electrodes including a plurality of first electrodes to which a first voltage is applied when power is transmitted; and a second group of electrodes including a plurality of second electrodes to which a second voltage is applied when power is transmitted, wherein the second voltage has a phase that is different from a phase of the first voltage by a value greater than 90 degrees and less than 270 degrees, wherein:

the plurality of first electrodes and the plurality of second electrodes are arranged in a first direction along an electrode installation surface; and at least two of the plurality of first electrodes and at least two of the plurality of second electrodes are arranged alternating with each other in the first direction.

A plurality of first electrodes and a plurality of second electrodes are arranged along a surface. The surface is referred to as the "electrode installation surface". The electrode installation surface is not limited to a flat plane in a strict sense, but may be a curved surface. The electrodes do not need to be on the same plane, but it is only required that they be arranged along the electrode installation surface.

Herein, "at least two of the plurality of first electrodes and at least two of the plurality of second electrodes are arranged alternating with each other in the first direction" means that these electrodes are arranged in the order of a first electrode, a second electrode, a first electrode and a second electrode in the first direction. That is, one second electrode is arranged between the two first electrodes, and one first electrode is arranged between the two second electrodes.

With such a configuration, when power is transmitted, the electric field produced from a first electrode and the electric field produced from an adjacent second electrode are partially canceled. As a result, it is possible to suppress the leakage electric field in a region over the gap (hereinafter referred to also as the "boundary") between first and second electrodes adjacent to each other. Then, it is possible to reduce the risk of causing other nearby devices to malfunction, for example.

In one embodiment, the number of first electrodes and the number of second electrodes are equal to each other. In another embodiment, the difference between the number of first electrodes and the number of second electrodes is 1. In these embodiments, all of the first electrodes and all of the second electrodes may be arranged alternating with each other. In such a case, each of the first electrodes is adjacent to one of the second electrodes and not adjacent to any of the other first electrodes. Each of the second electrodes is adjacent to one of the first electrodes and not adjacent to any of the other second electrodes.

With such a configuration, the effect of suppressing the leakage electric field described above is realized for any two adjacent electrodes from the first group of electrodes and the second group of electrodes. Thus, it is possible to realize an even more pronounced effect.

In order to further enhance the leakage electric field suppressing effect, the electrode unit may further include a conductor (referred to as a "third electrode") arranged with a gap from at least one of the first and second groups of electrodes. The third electrode is configured so as to have a third voltage whose amplitude is less than amplitudes of the first and second voltages when power is transmitted. At least a portion of the at least one third electrode may be arranged so as to be located outside or inside the area defined by the first and second groups of electrodes as seen from a direction perpendicular to the electrode installation surface.

With such a configuration, it is possible to suppress the leakage electric field in the vicinity of (particularly, on the side of) an outermost electrode or electrodes of the first and second groups of electrodes. Particularly, two third electrodes may be provided so as to be located on opposite sides of the area defined by the first and second groups of electrodes as seen from a direction perpendicular to the electrode installation surface. In such a case, it is possible to reduce the electric field intensity in the vicinity of two electrodes of the first and second groups of electrodes that are located at opposite sides, and it is therefore possible to realize an even more pronounced effect.

The electrode unit described above may include a sheet-shaped structure. The electrodes may be on the inner side of the sheet-shaped structure. A conductor pattern formed on the substrate included in the sheet-shaped structure may be used as the electrodes. The sheet-shaped structure may be a layered structure including a plurality of layers, for example. With a configuration in which third electrodes are provided, at least two of the first to third electrodes may be located in different ones of the plurality of layers. Such a configuration can be easily employed when a conductor (referred to as a "shield") for suppressing the leakage electric field is arranged in addition to the first to third electrodes, for example. Such a shield may be arranged so that the gap between a first electrode and a second electrode, adjacent to each other, is covered between the power transmitting device and the power receiving device, for example. In such a case, the shield is arranged in a layer that is different from the first electrode and the second electrode. The third electrode may also be arranged in the same layer as the shield, for example. The first and second electrodes may be arranged in different layers.

The electrode unit set forth above may be installed on the power transmitting device or the power receiving device of a wireless power transmission system based on an electric field coupling method. The power transmitting device includes an electrode unit, and a power transmitting circuit for supplying AC power to the first group of electrodes and the second group of electrodes of the electrode unit. The power receiving device includes an electrode unit, and a power receiving circuit for converting AC power received by the first and second electrodes of the electrode unit to DC power or a different type of AC power and supplying the converted power to a load. The wireless power transmission system includes both of such a power transmitting device and such a power receiving device.

In an embodiment in which the electrode unit is installed in the power transmitting device, the first and second groups of electrodes are connected to the power transmitting circuit. The power transmitting circuit includes an inverter circuit, for example. The inverter circuit outputs AC power to be supplied to the first and second groups of electrodes. With the power transmitting circuit, the first voltage is applied to the first group of electrodes and the second voltage antiphase to the first voltage is applied to the second group of electrodes. Herein, "antiphase" means that the phase is different by a value greater than 90 degrees and less than 270 degrees. In one embodiment, the difference between the phase of the first voltage and the phase of the second voltage is set to be substantially 180 degrees. The amplitude of the second voltage is typically substantially equal to the amplitude of the first voltage, but they may be different from each other.

On the other hand, in an embodiment in which, the electrode unit is installed in the power receiving device, the first and second, groups of electrodes are connected to the power receiving circuit. The power receiving circuit circuit, for example. The first and second groups of electrodes of the power receiving device receive AC power from the first and second groups of electrodes of the power transmitting device, opposing the first and second groups of electrodes of the power receiving device. Then, the first voltage is applied to the first group of electrodes of the power receiving device, and the second voltage antiphase to the first voltage is applied to the second group of electrodes.

Herein, an electrode unit installed in the power transmitting device may be referred to as the "power transmitting electrode unit", and an electrode unit installed in the power receiving device may be referred to as the "power receiving electrode unit". The electrodes of the power transmitting electrode unit may be referred to as "power transmitting electrodes", and the electrodes of the power receiving electrode unit as "power receiving electrodes".

In one embodiment, the number of first electrodes in the power receiving electrode unit is equal to the number of first electrodes in the power transmitting electrode unit, and the number of second electrodes in the power receiving electrode unit is equal to the number of second electrodes in the power transmitting electrode unit. In such an embodiment, the first electrodes of the power receiving electrode unit respectively oppose the first electrodes of the power transmitting electrode unit when power is transmitted. Similarly, the second electrodes of the power receiving electrode unit respectively oppose the second electrodes of the power transmitting electrode unit when power is transmitted. Electric power is transmitted opposing electrodes. In order to realize efficient power transmission, the power transmitting electrode unit and the power receiving electrode unit may be designed with the same number of first electrodes, the same number of second electrode, the same width or widths of the electrodes, and the same arrangement of the electrodes. Note however that power transmission is possible even if these parameters are not strictly equal between the power transmitting electrode unit and the power receiving electrode unit. For example, the number of first electrodes in the power receiving electrode unit may be different from the number of first electrodes in the power transmitting electrode unit, and the number of second electrodes in the power receiving electrode unit may be different from, the number of second electrodes in the power transmitting electrode unit. Even in such a case, it is possible to ensure a good power transmission property by appropriately designing the width of each electrode.

The power receiving device may be installed on a vehicle, for example. The "vehicle" as used herein is not limited to a vehicle such, as a transport robot set forth above, but refers to any movable object that is driven by electric power. The vehicle includes a powered vehicle that includes an electric motor and one or more wheels, for example. Such a vehicle can be an automated guided vehicle (AGV) such as a transport robot set forth above, a forklift, an overhead hoist transfer (OHT), an electric car (EV), an electric cart, or an electric wheelchair, for example. The "vehicle" as used herein also includes a movable object that does not include wheels. For example, the "vehicle" includes biped walking robots, unmanned aerial vehicles (UAVs, so-called "drones") such as multicopters, manned electric aircrafts, and elevators.

An electronic device according to another embodiment of the present disclosure is installed on a vehicle including a power receiving device set forth above. The power receiving device receives electric power that is wirelessly transmitted from the power transmitting device, and supplies the electric power to a load. The electronic device includes a sensing device. The sensing device obtains information from a sensing object around the vehicle by using electromagnetic field or ultrasonic waves. The electronic device may further include a blocking member. The blocking member blocks the leak electromagnetic field that occurs when power is transmitted from, the power transmitting device to the power receiving device without hindering the transfer of the electromagnetic field or ultrasonic waves from the sensing object to the sensing device. The electronic device may be arranged between one of the first group of electrodes and one of the second group of electrodes that are adjacent to each other as seen from a direction perpendicular to the electrode installation surface, for example.

The "sensing device" may be any electronic device such as an imaging device, a human detection sensor, an obstruction detection sensor, an RFID reader, a wireless communication device, an ultrasonic sensor, or a temperature sensor, for example. The sensing device is capable of obtaining information from, sensing objects around the vehicle by using electromagnetic waves such as ultraviolet rays, visible light, infrared rays, terahertz waves or microwaves, or by using electromagnetic induction. That is, the sensing device is capable of sensing the ambient environment by using an electromagnetic field. Other than using an environment, around the vehicle by using any other physical variations such as ultrasonic waves.

The "sensing object" (hereinafter referred to also as an "object") may be a mark including the one-dimensional or two-dimensional code described above, for example. The sensing device may be an imaging device including a one-dimensional or two-dimensional array of photoelectric conversion devices, or a barcode reader. These sensors are capable of obtaining information recorded in the code by capturing the image of the mark. The code may include location information, for example. In such a case, the sensing device can obtain the location information of the code by reading the code. Thus, it is possible to recognize the location of the vehicle.

The "sensing object" may be a human or any other obstruction (e.g., an animal, another vehicle, or an article temporarily placed there). In such a case, the sensing device may be a sensor such, as a RADAR, a LIDAR, an infrared sensor, an imaging device or an ultrasonic sensor, for example. These sensors are capable of detecting the presence of a human or any other obstruction thereabound by using electromagnetic waves or ultrasonic waves. The vehicle can perform various operations based on the output of the sensor. For example, when it is detected, that there is a human or an article in the vicinity of the power transmitting electrodes, the vehicle can instruct the power transmitting device so as to reduce or stop the power transmission.

Note that the electromagnetic field or ultrasonic waves propagating from a sensing object to the sensing device may slightly attenuate when passing through the blocking member. As used herein, the blocking member allowing the majority of the energy of the electromagnetic field, or ultrasonic waves to pass therethrough means that "the propagation of the electromagnetic field or ultrasonic waves is not hindered". The function of the present disclosure can be realized when the degree of attenuation of the energy of the electromagnetic field or ultrasonic waves to be sensed is less than the degree of suppression of the electromagnetic component energy of the noise frequency band to be blocked.

The blocking member may completely surround the sensing device, or may partially surround the sensing device if there is little influence of electromagnetic noise. The material of the blocking member may be appropriately selected based on the frequency to be used for transmitting power and on the mode of sensing.

When the sensing device obtains information from sensing objects by using light, the blocking member may include a transparent conductive member. The transparent conductive member may be arranged on the path of light entering the sensing device from sensing objects. The transparent conductive member allows light to pass therethrough, but blocks the electromagnetic field having a relatively low frequency that is caused by power transmission. Thus, it is possible to relax the influence on the sensing device from the electromagnetic field around each electrode, without affecting the sensing. The blocking member may surround the sensing device with the transparent conductive member and a non-transparent common conductive member.

The term "light", as used herein, is not limited to visible light (electromagnetic waves whose wavelength is about 400 nm to about 700 nm), but includes ultraviolet rays (electromagnetic waves whose wavelength is about 10 nm to about 400 nm) and infrared rays (electromagnetic waves whose wavelength is about 700 nm to about 2500 nm). Ultraviolet rays may be referred to as "light in the ultraviolet range" or "ultraviolet light", visible light may be referred to as "light in the visible range", and infrared rays may be referred to as "light in the infrared range" or "infrared light".

In an embodiment in which the sensing device obtains information from sensing objects by using electromagnetic waves, the blocking member may include a shield having at least one aperture therein. Such a shield may be arranged on the path of propagation of electromagnetic waves from sensing objects to the sensing device. At least the surface of the shield is conductive. The shield may be grounded. In such an embodiment, the sensing device obtains information from sensing objects by using electromagnetic waves of a band whose lowest frequency fm is higher than the frequency f1 of electric power to be transmitted, from the power transmitting device to the power receiving device. The diameter of each aperture in the shield is set to a value that is greater than half the wavelength of the electromagnetic waves used for sensing and that is less than half the wavelength of the electromagnetic waves of the frequency used for transmitting electric power. In other words, the diameter of each aperture in the shield may be set to a value that is greater than c/(2 fm) and less than c/(2 f1), where c is the speed of light in vacuum. Then, the shield can block electromagnetic waves of relatively low frequencies caused by power transmission while allowing to pass therethrough electromagnetic waves of relatively high frequencies used for sensing.

A sensing object may be arranged between two power transmitting electrodes adjacent to each other, for example. A sensing object may be a communication device, such as a mark including a one-dimensional, or two-dimensional code or an RF tag arranged between two power transmitting electrodes. In such a case, the blocking member may include a shield having a transparent conductive member described above or at least one aperture on the path of electromagnetic waves such as light or radio waves extending from the mark or the communication device to the sensing device.

A sensing object may be located on one power transmitting electrode included in the group of power transmitting electrodes. In such a case, a portion of a power receiving electrode that overlaps the sensing object with the group of power transmitting electrodes and the group of power receiving electrodes opposing each other may be made of a light transmissive material. The sensing device can obtain information by detecting light from the sensing object that has passed through the light transmissive portion of the power receiving electrode.

Embodiments of the present disclosure will now be described in greater detail. Note however that unnecessarily detailed descriptions may be omitted. For example, detailed descriptions on what are well known in the art and redundant descriptions on substantially the same configurations may be omitted. This is to prevent the following description from becoming unnecessarily redundant, to make it easier for a person of ordinary skill in the art to understand. Note that, the present inventors provide the accompanying drawings and the following description in order for a person of ordinary skill in the art to sufficiently understand the present disclosure, and they are not intended to limit the subject matter set forth in the claims. In the following description, elements having the same function or similar functions are denoted by the same reference signs.

Embodiment 1

Figure 4:
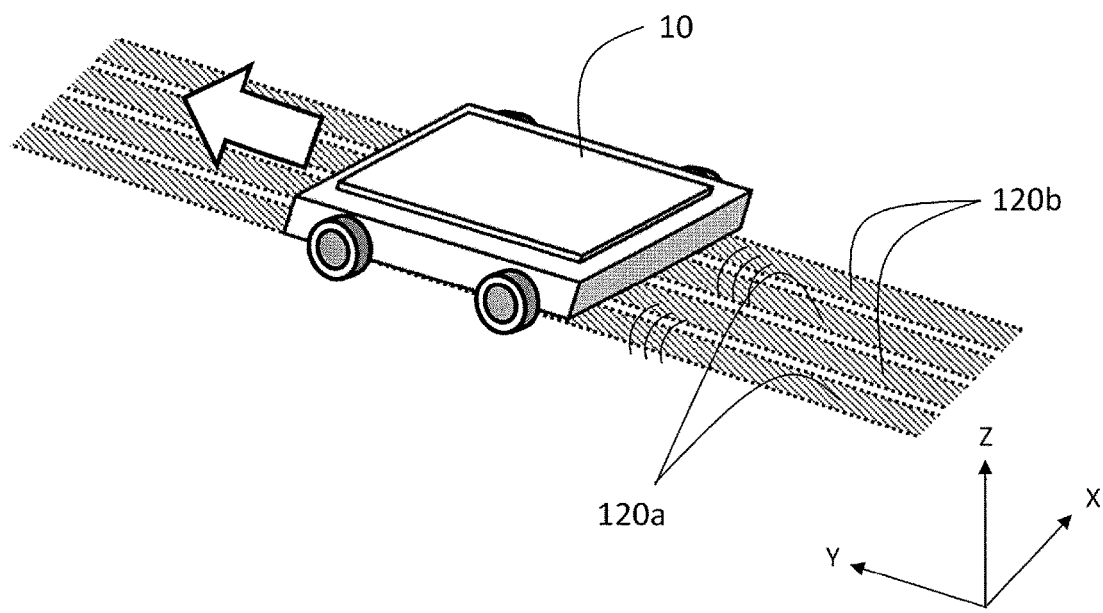
FIG. 4 is a diagram, schematically showing a wireless power transmission system according to Embodiment 1 of the present disclosure.

FIG. 4 is a diagram schematically showing a wireless power transmission system according to Embodiment 1 of the present disclosure. In the system shown in FIG. 4, as opposed to the system shown in FIG. 1, the power transmitting device includes a first group of power transmitting electrodes including a plurality of first power transmitting electrode 120a, and a second group of power transmitting electrodes including a plurality of second power transmitting electrodes 120b. Two first power transmitting electrodes 120a and two second power transmitting electrodes 120b are arranged alternating with each other with regular intervals therebetween in the first direction (the X direction in this example) along the surface of the first power transmitting electrodes 120a. The plurality of first power transmitting electrodes 120a and the plurality of second power transmitting electrodes 120b extend parallel to each other along the floor surface, and are arranged substantially coplanar with each other.

The power receiving device includes a first group of power receiving electrodes including a plurality of first power receiving electrodes, and a second group of power receiving electrodes including a plurality of second power receiving electrodes. When power is transmitted, a plurality of first power receiving electrodes respectively oppose a plurality of first power transmitting electrodes, and a plurality of second power receiving electrodes respectively oppose a plurality of second power transmitting electrodes. In this state, electric power is wirelessly transmitted from the power transmitting device to the transport robot 10 including the power receiving device.

Figure 5:
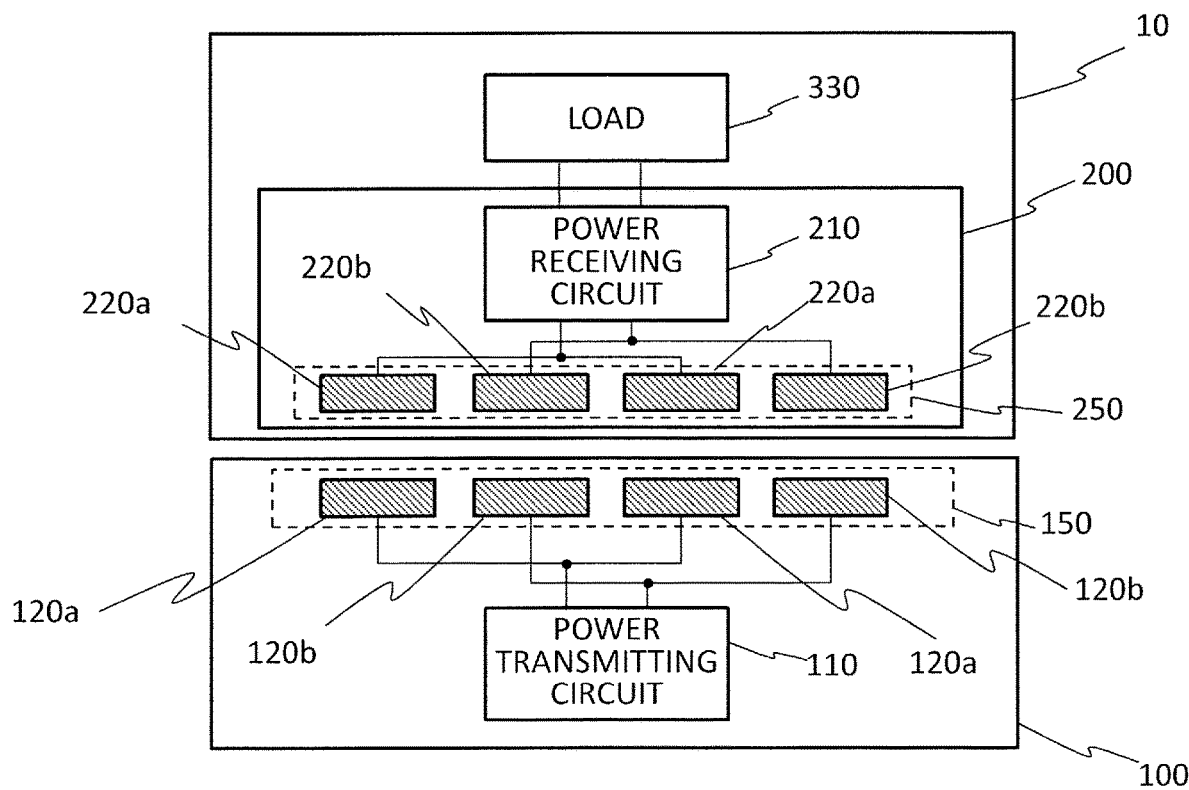
FIG. 5 is a diagram showing a general configuration of the wireless power transmission system shown in FIG. 4.

FIG. 5 is a diagram showing a general configuration of the wireless power transmission system shown in FIG. 4. The power transmitting device 100 of the present embodiment includes a power transmitting electrode unit 150 and the power transmitting circuit 110. The power transmitting electrodes 120a and two second power transmitting electrodes 120b. The power transmitting circuit 110 is an AC output circuit including an inverter circuit, for example. The power transmitting circuit 110 converts the DC power supplied from a DC power supply (not shown) to AC power, and outputs the AC power to the power transmitting electrodes 120a and 120b.

The power transmitting circuit 110 includes two terminals for outputting AC power. One terminal is connected to two first power transmitting electrodes 120a, and the other terminal is connected to two second power transmitting electrodes 120b. When transmitting power, the power transmitting circuit 110 applies a first voltage to two first power transmitting electrodes 120a, and applies a second voltage antiphase to the first voltage to two second power transmitting electrodes 120b.

The transport robot 10 includes the power receiving device 200 and a load 330. The power receiving device 200 includes a power receiving electrode unit 250 and the power receiving circuit 210. The configuration of the power receiving circuit 210 and the load 330 is similar to that shown in FIG. 2. The power receiving electrode unit 250 includes two first power receiving electrodes 220a and two second power receiving electrodes 220b. The two first power receiving electrodes 220a and the two second power receiving electrodes 220b are arranged alternating with each other in one direction (the X direction in FIG. 4).

In the present embodiment, the width of each of the four power receiving electrodes and the interval therebetween of the power receiving electrode unit 250 are set to be substantially equal to those of the four power transmitting electrodes of the power transmitting electrode unit 150. When power is transmitted, two first power receiving electrodes 220a respectively oppose two first power transmitting electrodes 120a, and two second power receiving electrodes 220b respectively oppose two second power transmitting electrodes 120b. In this state, when AC power is output from the power transmitting circuit 110, electric power is transmitted in a contactless manner via a capacitive coupling between the group of power transmitting electrodes and the group of power receiving electrodes opposing each other.

The transport robot 10 can received electric power from the power transmitting device 100 while standing or running over the power transmitting electrodes 120a and 120b. The transport robot 10 moves in the direction in which the electrodes extend (the Y direction in FIG. 4) while keeping the power transmitting electrodes 120a and 120b and the power receiving electrodes 220a and 220b adjacent to and opposing each other. Thus, the transport robot 10 can move while charging a condenser such as a capacitor, for example.

Figure 6:
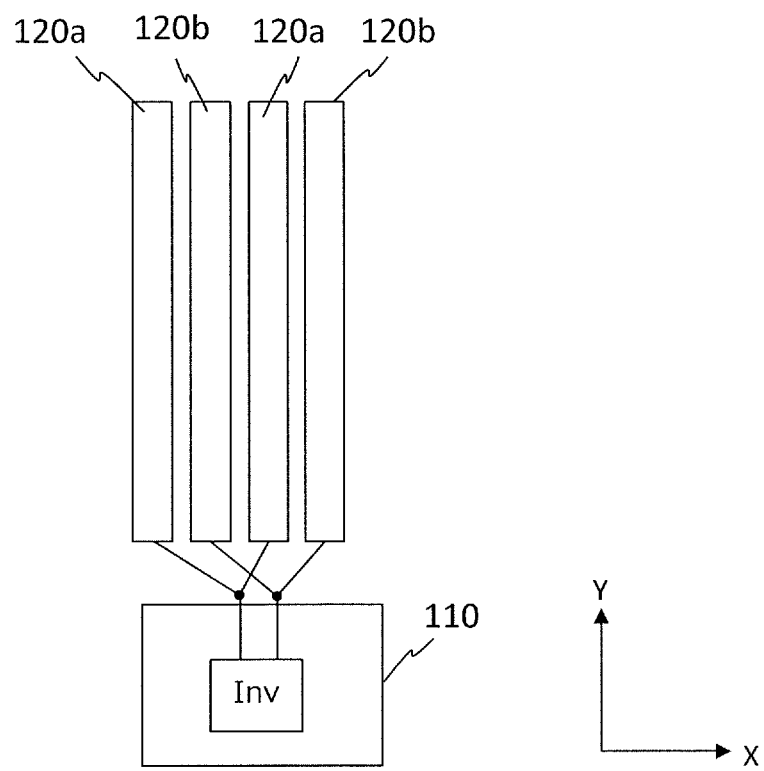
FIG. 6 is a top view schematically showing a configuration example of a power transmitting device.

FIG. 6 is a top view schematically showing the configuration of the power transmitting device of the present embodiment. As shown in the figure, the power transmitting circuit 110 includes an inverter circuit (Inv). When transmitting power, the inverter circuit applies a first voltage to two first power transmitting electrodes 120a, and applies a second voltage antiphase to the first voltage to two second power transmitting electrodes 120b. Herein, antiphase means that the phase difference is greater than 90 degrees and less than 270 degrees. Typically, the phase of the second voltage is 180 degrees different from the phase of the first voltage. Note however that electric power can be transmitted even when the phase difference is shifted from 180 degrees. The amplitude of the second voltage is substantially equal to the amplitude of the first voltage. Strictly speaking, the first and second voltages does not only include the component of the transmission frequency, but may also include components of other frequencies. In this case, the phase-related condition described above is satisfied for the component of the transmission frequency. The term "transmission frequency", as used herein, means the switching frequency of the inverter circuit connected to the power transmitting electrodes 120a and 120b.

Next, the effect of suppressing the leakage electric field of the present embodiment will be described.

Figure 7:
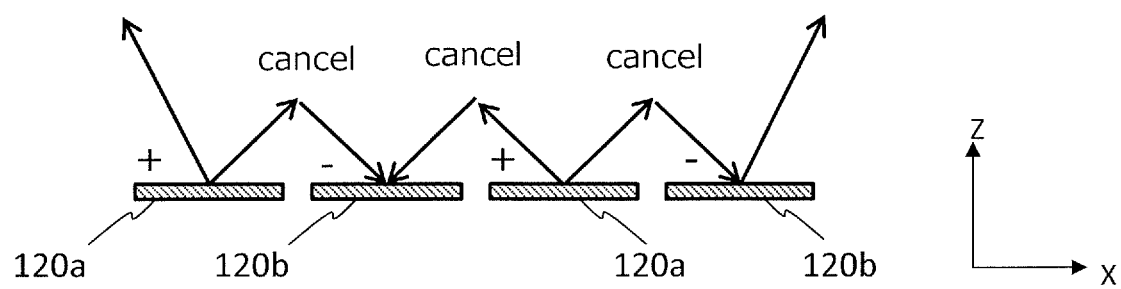
FIG. 7 is a schematic cross-sectional view illustrating the effect of suppressing the leakage electric, field.

FIG. 7 is a schematic cross-sectional view illustrating the effect, of suppressing the leakage electric field according to the present embodiment. Arrows in the figure schematically represent a part of electrical flux. FIG. 7 shows the moment when a positive (+) voltage is applied to the first power transmitting electrodes 120a and a negative (−) voltage to the second power transmitting electrodes 120b. At other moments, a negative (−) voltage is applied to the first power transmitting electrodes 120a and a positive (+) voltage to the second power transmitting electrodes 120b. In FIG. 7, electrical flux lines are not drawn on the back side (the −Z side) of the power transmitting electrodes 120a and 120b.

As shown in FIG. 7, in the present embodiment, two first power transmitting electrodes 120a and two second power transmitting electrodes 120b, to which a positive voltage and a negative voltage are applied respectively at one moment, are arranged alternating with each other in the X direction. Therefore, the electric field formed by the first power transmitting electrodes 120a having a first voltage and the electric field formed by the second power transmitting electrodes 120b having a second voltage antiphase to the first voltage are partially canceled. As a result, this primarily reduces the intensity of the electric field formed over the gap between the first, power transmitting electrode 120a and the second power transmitting electrode 120b. This effect occurs similarly between any two electrodes adjacent to each other. Therefore, in the present embodiment, as compared with a case in which two relatively wide power transmitting electrodes are used as shown in FIG. 1, for example, it is possible to reduce the leakage electric field in regions that are away from the electrodes in the Z direction.

Such an effect can be realized also when the number of first power transmitting electrodes 120a and the number of second power transmitting electrodes 120b are not two. It is only required that the number of at least one of the first power transmitting electrodes 120a and the second power transmitting electrodes 120b be two or more, and at least some of the first and second power transmitting electrodes be arranged alternating with each other. The number of first power transmitting electrodes 120a and the number of second power transmitting electrodes 120b do not need to be equal to each other.

It is possible to particularly effectively suppress the leakage electric field when the difference between the number of first power transmitting electrodes 120a and the number of second power transmitting electrodes 120b is 1 or 0, and they are arranged alternating with each other. Thus, some such examples will now be described.

Figure 8A:
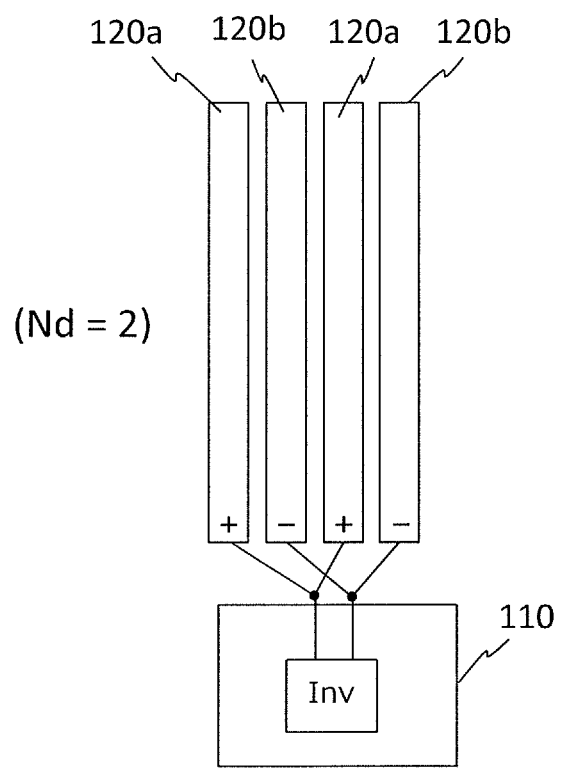
FIG. 8A is a top view schematically showing an example in which the power transmitting device includes two first power transmitting electrodes 120a and two second power-transmitting electrodes 120b.

In the following description, Nd denotes the number of pieces into which the first and second power transmitting electrodes 120a and 120b are each divided. The number of divisions represents the number of pieces into which the first and second power transmitting electrodes 120a and 120b are each divided with respect to the configuration of the reference example shown in FIG. 1. Note however that where the number of first power transmitting electrodes 120a and the number of second power transmitting electrode 120b are different from each other, the number of divisions Nd is represented by a decimal fraction representing the average value therebetween. For example, when the number of first power transmitting electrode 120a is two and the number of second power transmitting electrodes 120b is three, Nd=2.5. The following description primarily assumes cases in which the electrodes all have an equal length, and the total width of the first group of power transmitting electrodes is substantially equal to the total width of the second group of power transmitting electrodes. As used herein, "substantially equal" is not limited to two widths being equal to each other in a strict sense, but it falls within the definition of "substantially equal" when the difference between two widths is less than 10 percent of the smaller width. The lengths and the widths of the electrodes are not limited to the following example, but may be adjusted as needed within such a range that power can be transmitted, FIG. 8A is a top view schematically showing an example in which the power transmitting device includes two first power transmitting electrodes 120a and two second power transmitting electrodes 120b. The configuration is the same as that shown in FIG. 6, where Nd=2. In this example, the electrodes all have an equal width and an equal length.

Figure 8B:
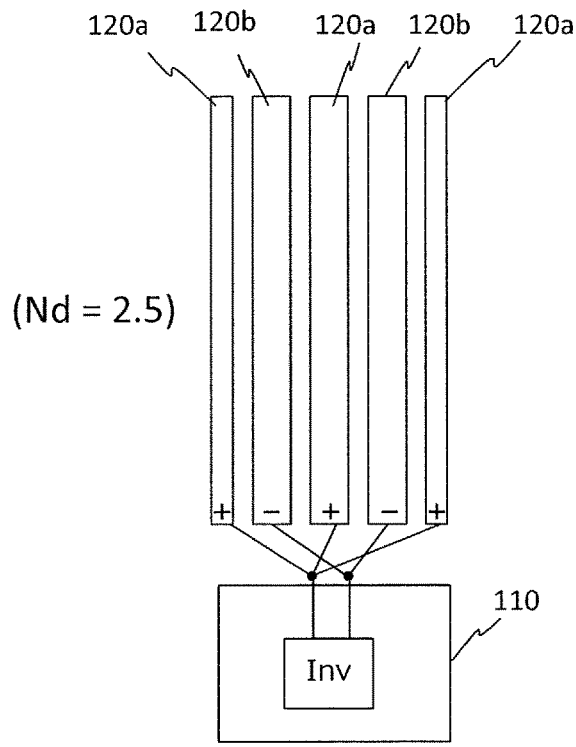
FIG. 8B is a top view schematically showing an example in which the power transmitting device includes three first power transmitting electrodes 120a and two second power transmitting electrodes 120b therebetween.

FIG. 8B is a top view schematically showing an example in which the power transmitting device includes three first power transmitting electrodes 120a and two second power transmitting electrodes 120b therebetween. In this example, Nd=2.5. The inner first power transmitting electrode 120a and the two second power transmitting electrodes 120b have a width that is twice the width of the outer two first power transmitting electrodes 120a. At one moment, a positive voltage is applied to the three first power transmitting electrodes 120a, and a negative voltage to the two second power transmitting electrodes 120b. Therefore, the electric fields formed by the three first power transmitting electrodes 120a and the two second power transmitting electrodes 120b therebetween are partially canceled, thereby reducing the leakage electric field.

Figure 8C:
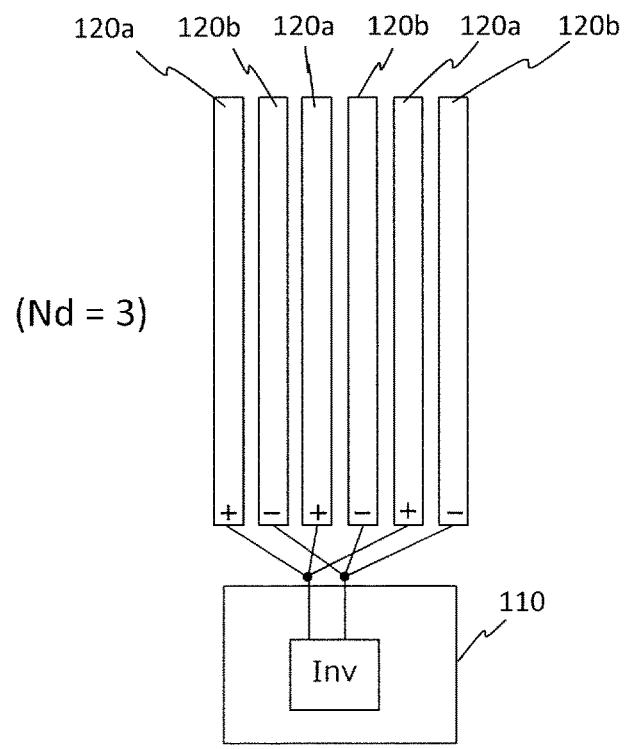
FIG. 8C is a top view schematically showing the power transmitting device includes three first power transmitting electrodes 120a and three second power transmitting electrodes 120b.

FIG. 8C is a top view schematically showing an example in which the power transmitting device includes two first power transmitting electrodes 120a and two second power transmitting electrodes 120b. In this example, Nd=3. The electrodes all have an equal length and an equal width. One or two second power transmitting electrode 120b is arranged adjacent to the first power transmitting electrodes 120a. Similarly, one or two first power transmitting electrode 120b is arranged adjacent to the second power transmitting electrodes 120b. At one moment, a positive voltage is applied to the three first power transmitting electrodes 120a, and a negative voltage to the three second power transmitting electrodes 120b. Therefore, the electric fields formed by the three first power transmitting electrodes 120a and the three second power transmitting electrodes 120b are partially canceled, thereby reducing the leakage electric field.

Other than the examples shown in FIG. 8A to FIG. 8C, four or more of at least one of the first power transmitting electrodes 120a and the second power transmitting electrodes 120b may be arranged, i.e., Nd=3.5 or more, for example.

In the examples described above, for the two electrodes located on the opposite sides of the group of power transmitting electrodes, there is a small leakage electric field suppressing effect because there is no other electrodes on the outer side thereof. In order to solve this problem, at least one conductor may be arranged in the vicinity of at least one of the two electrodes on the opposite sides, wherein the at least one conductor has a voltage that is different from the voltage of the at least one electrode. Herein, such a conductor is referred to as the "third electrode", and the voltage that the third electrode has is referred to as the third voltage.

Figure 9:
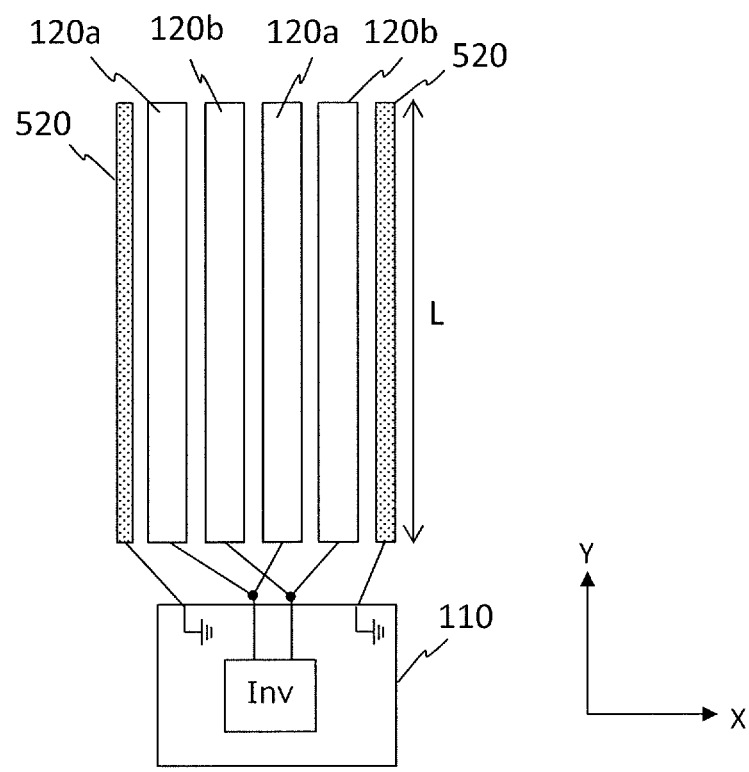
FIG. 9 is a top view schematically showing an example of a configuration in which two third electrodes 520 are arranged on opposite sides of a group of power transmitting electrodes.

FIG. 9 is a top view schematically showing an example of a configuration in which two third electrodes 520 are arranged on opposite sides of a group of power transmitting electrodes. In this example, two third electrodes 520 are arranged in addition to the configuration shown in FIG. 8B. The third electrodes 520 are arranged with an interval from the first power transmitting electrode 120a and the second power transmitting electrode 120b that are located on the opposite sides.

The third electrodes 520 extend in the same direction as the direction in which the first power transmitting electrodes 120a and the second power transmitting electrodes 120b extend. The width (the dimension in the X direction) of each third electrode 520 is smaller than the width of each first power transmitting electrode 120a and the width of each second power transmitting electrode 120b. The width of each third electrode 520 may be very small, and may be less than 12% the width of each of the first and second power transmitting electrodes 120a and 120b, for example. As seen from the direction perpendicular to a plane parallel to the first and second power transmitting electrodes 120a and 120b, the area of each of the third electrodes 520 is less than the area of each of the first and second power transmitting electrodes 120a and 120b. The area of each third electrode 520 may also be very small, and may be less than 12% the area of each of the first and second power transmitting electrodes 120a and 120b, for example.

The amplitude of the third voltage that the third electrode 520 has is less than the amplitude of the first and second voltages. The term "voltage", as used herein, means the potential with respect to the reference potential. The reference potential is typically the ground potential.

When transmitting power, there are generally two methods to ensure that each third electrode 520 has a voltage as described above. The first method is to ground each third electrode 520 as in the example of FIG. 9. The second method is to ground the two third electrodes 520 with each other.

In the example of FIG. 9, the two third electrodes 520 are grounded. In this example, the two third electrodes 520 are each connected to a ground, terminal of the power transmitting circuit 110. When transmitting power, an AC voltage is applied from the inverter circuit Inv of the power transmitting circuit. 110 to the power transmitting electrodes 120a and 120b at the opposite sides. The ground potential is supplied, to the two third electrodes 520. As a result, the electrical flux generated from: the power transmitting electrodes 120a and 120b at the opposite sides are oriented with respect to the ground potential. Therefore, as compared with a case in which there is no third electrode 520, the distribution of the leakage electric field will rapidly converge into a small range.

Figure 10:
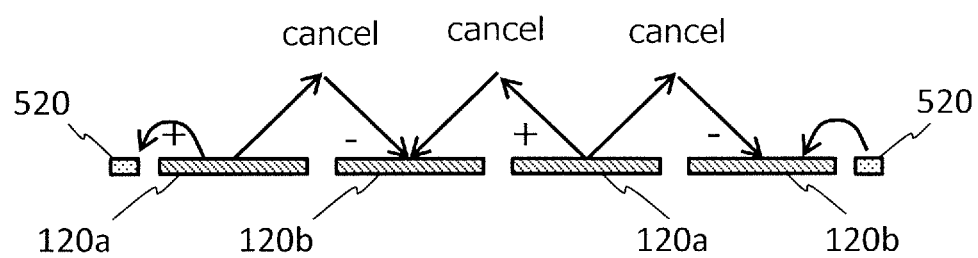
FIG. 10 is a cross-sectional view schematically showing the effect of the third electrodes 520.

FIG. 10 is a cross-sectional view schematically shelving the effect of the third electrodes 520. As shown in the figure, the leakage electric fields on the upper and lower surfaces of two power transmitting electrodes 120a and 120b and on the side thereof are reduced via the electromagnetic coupling between the two power transmitting electrodes 120a and 120b at the opposite sides and the two third electrodes 520 in the vicinity thereof. Thus, it is possible to reduce the malfunction of devices not only for the direction that is perpendicular to the surface of the group of power transmitting electrodes but also for the direction that is parallel to the surface.

In the example of FIG. 9, the first power transmitting electrodes 120a, the second power transmitting electrodes 120b and the third electrodes 520 extend in the same direction. The length of each third electrode 520 from one end thereof that is connected to the ground terminal to the other end thereof (L shown in FIG. 9) may be set to be less than ¼ the wavelength corresponding to the frequency of the electric power transmitted, for example. This is to prevent the third electrode 520 from functioning as an antenna and giving unnecessary radiation.

Figure 11A:
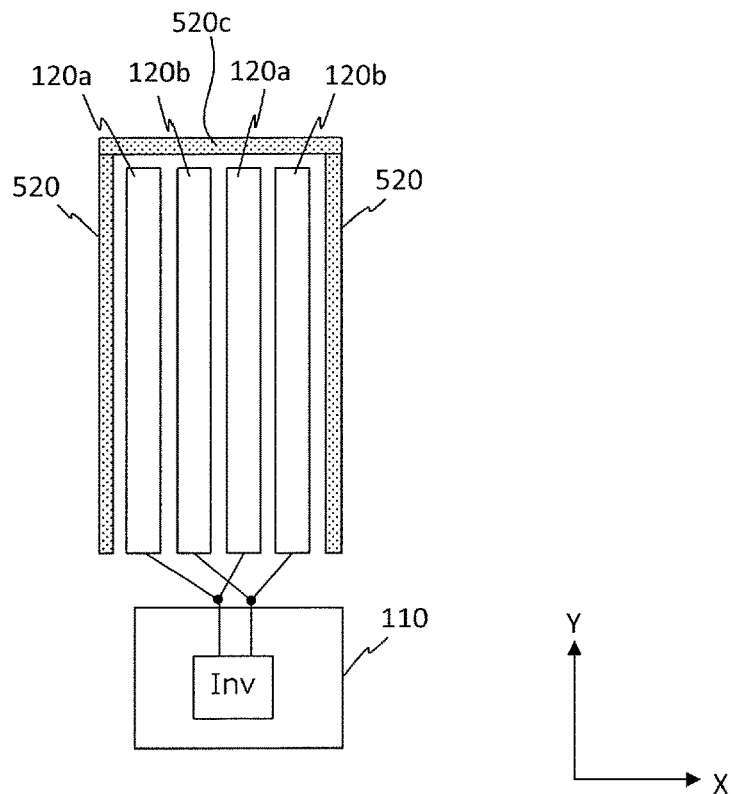
FIG. 11A is a diagram schematically showing an example of a configuration in which two third electrodes 520 are connected to each other.
Figure 11B:
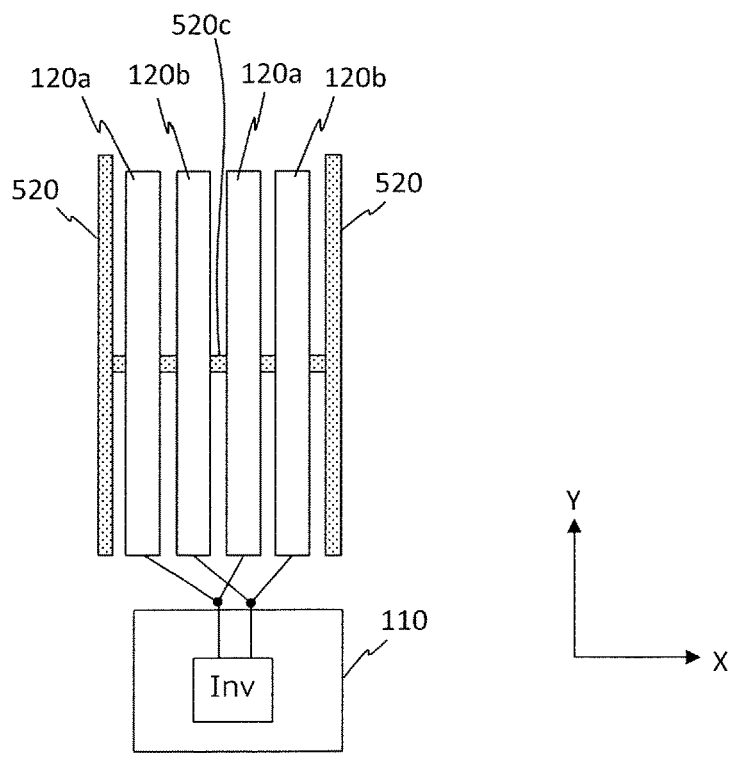
FIG. 11B is a diagram schematically showing another example of a configuration in which two third electrodes 520 are connected together.

FIG. 11A and FIG. 11B are each a diagram schematically showing an example of a configuration in which two third electrodes 520 are connected to each other. In these examples, the power transmitting electrode unit further includes a connecting conductor 520c that electrically connects together the two third electrodes 520. The third voltage is supplied to the two third electrodes 520 via an electromagnetic coupling of one third electrode 520 and a portion of the connecting conductor 520c with the first power transmitting electrode 120a, and an electromagnetic coupling of the other third electrode 520 and another portion of the connecting conductor 520c with the second power transmitting electrode 120b.

In the example of FIG. 11A, the two third electrodes 520 extend in the same direction as the direction in which the power transmitting electrodes 120a and 120b extend. The length of the two third electrodes 520 are slightly longer than that of the power transmitting electrodes 120a and 120b. The connecting conductor 520c connects together ends of the two third electrodes 520. The power transmitting electrodes 120a and 120b are located inside the area that is defined by the two third electrodes 520 and the connecting conductor 520c as seen from the direction perpendicular to the XY plane. Herein, the area that is defined by the two third electrodes 520 and the connecting conductor 520c refers to the area that is surrounded by these portions.

In the example of FIG. 11B, on the back side of the first power transmitting electrode 120a and the second power transmitting electrode 120b, the connecting conductor 520c connects together portions of the two third electrodes 520 other than the opposite ends thereof. The term "back side" means the side opposite from the side on which the power receiving electrodes 220a and 220b are located when transmitting power. The connecting conductor 520a may connect together central portions of the two third electrodes 520, as shown in the figure, or may connect together other portions.

With the configuration shown in FIG. 11A and FIG. 11B, when an AC voltage is applied to the power transmitting electrodes 120a and 120b, a capacitive coupling occurs between the two third electrodes 520 and the connecting conductor 520c and the power transmitting electrodes 120a and 120b. Specifically, a portion of the connecting conductor 520c that is close to the two first power transmitting electrodes 120a and one of the third electrodes 520 are coupled with the first power transmitting electrodes 120a. On the other hand, a portion of the connecting conductor 520c that is close to the second power transmitting electrodes 120b and the other third electrode 520 are coupled with the second power transmitting electrodes 120b. Since the third electrodes 520 are forcibly electrically connected together via the connecting conductor 520c, the potential thereof is forcibly fixed. As a result, the advantageous effect of the third electrode having the low-amplitude third potential is exerted around the power transmitting electrodes 120a and 120b. That is, the intensity of the leakage electric field decreases rapidly in the X-axis direction.

With the configurations shown in FIG. 11A and FIG. 11B, the two third electrodes 520 and the connecting conductor 520c may be designed so that the coupling capacity between the two first power transmitting electrodes 120a is close to the coupling capacity between the two second power transmitting electrodes 120b. For example, the two third electrodes 520 and the connecting conductor 520c may be designed so that these two coupling capacities coincide with each other. With such configurations, it is possible to more effectively suppress the leakage electric field.

The present inventors conducted an electromagnetic field analysis both for the configuration of the present embodiment and for the configuration of a reference example in which the first and second power transmitting electrodes are not divided to test the advantageous effects of the present embodiment. The analysis result will now be described with reference to FIG. 12.

In this analysis, the change of the extent of the region (referred to as the risk region) where the electric field intensity exceeds the reference value defined by ICNIRP with respect to the number of electrode divisions Nd. Four different configurations shown in Table 1 below were used in the analysis.

TABLE 1

| Number of divisions Nd | 1 (Reference example) | 2 | 2.5 | 3 |
|---|---|---|---|---|
| Width w1 of first power transmitting electrode | 150 mm | 75 mm × 2 | 75 mm × 1<br>37.5 mm × 2 | 50 mm × 3 |
| Width w2 of second power transmitting electrode | 150 mm | 75 mm × 2 | 75 mm × 2 | 50 mm × 3 |
| Interelectrode gap | 25 mm | 8.3 mm | 6.25 mm | 5 mm |

Each configuration was set so that the total width of all the first power transmitting electrodes 120a and the total width of all the second power transmitting electrodes 120b are equal to each other at 150 mm.

The configuration of Nd=1 corresponds to the configuration shown in FIG. 1. The width w1 of the first power transmitting electrode 120a and the width w2 of the second power transmitting electrode 120b are both 150 mm.

The configuration of Nd=2 corresponds to the configuration shown in FIG. 8A. The width w1 of each of the two first power transmitting electrodes 120a and the width w2 of each of the two second power transmitting electrodes 120b are both 75 mm.

The configuration of Nd=2.5 corresponds to the configuration shown in FIG. 8B. The width of each of the two first power transmitting electrodes 120a at the opposite sides is 37.5 mm, and the width of each of the first power transmitting electrode 120a at the center and the two second power transmitting electrodes 120b on the opposite sides thereof is 75 mm.

The configuration of Nd=3 corresponds to the configuration shown in FIG. 8C. The width w1 of each of the three first power transmitting electrodes 120a and the width w2 of each of the three second power transmitting electrodes 120b are both 50 mm.

For configuration, the case in which the two third electrodes 520 were arranged as shown in FIG. 9 and the case in which the two third electrodes 520 were absent were analyzed. The other parameters used for the analysis were as follows.

Figure 12:
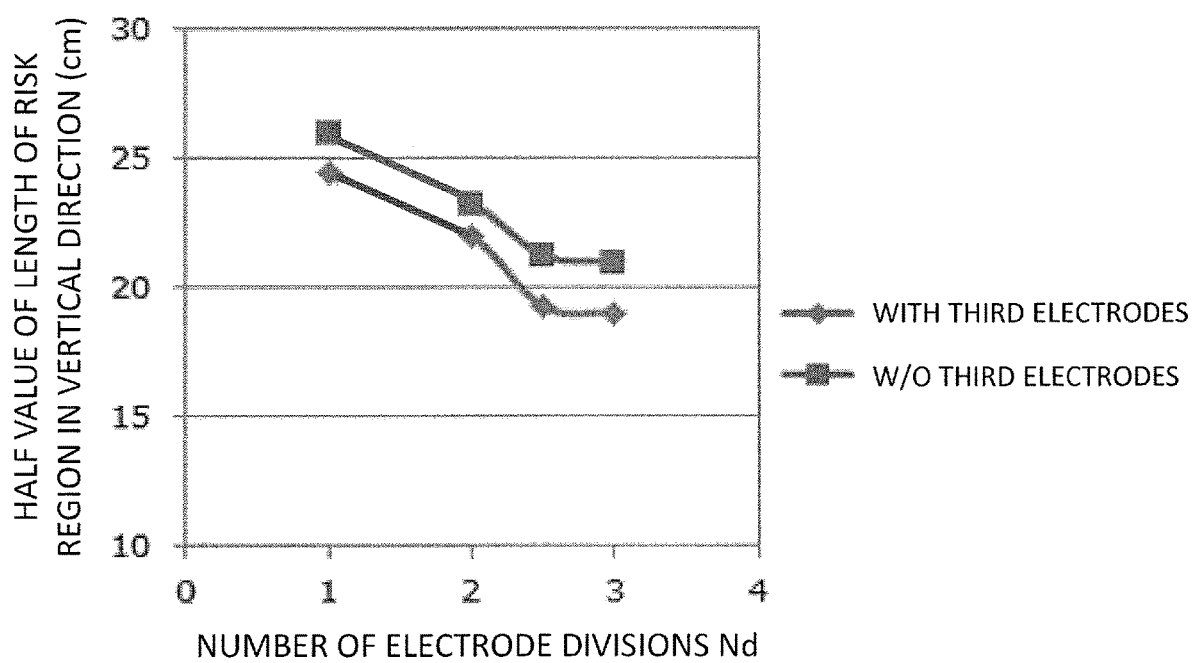
FIG. 12 is a graph showing the change of the leakage electric field suppressing effect with respect to the number of pieces into which an electrode is divided and the presence/absence of the third electrode.

Length of each electrode; 450 mm
Input power: 1 kW
Width of each third electrode; 1 mm
Gap between two power transmitting electrodes at opposite sides and third electrode; 0.5 mm FIG. 12 is a graph showing the analysis result. The horizontal axis represents the number of divisions Nd, i.e., the four different configurations. The vertical axis represents the distance from the surface of the central portion of the group of power transmitting electrodes to a point at which the electric field intensity becomes less than or equal to the reference value defined by ICNIRP. This distance corresponds to the half value of the length of the risk region in the direction perpendicular to the electrode surface.

As can be seen from FIG. 12, the risk region is reduced in the direction perpendicular to the electrodes with any of the configurations as compared with the reference example where Nd=1. This effect is more pronounced for higher numbers of divisions Nd of the electrode. The results confirmed the effectiveness of the present embodiment in which the number of electrode divisions Nd is increased. Particularly, the effect is more pronounced with configurations in which the third electrodes 520 are arranged.

With the configuration shown in FIG. 8B, two of the first group of electrodes and the second group of electrodes that are located at opposite sides have a width smaller than that of any of the other electrodes. With such a configuration, as compared with a case in which all the electrodes have the same width value, it is possible to suppress the leakage electric field on both sides. This effect can also be realized, when the width of only one of the two electrodes located at opposite sides is smaller than the width of other electrodes adjacent to the subject electrode. In other words, the width of at least one of the two electrodes of the first group of electrodes and the second group of electrodes that are located at opposite sides may be smaller than the width of other electrodes adjacent to at least one of the two electrodes. This will now be described.

Figure 13A:
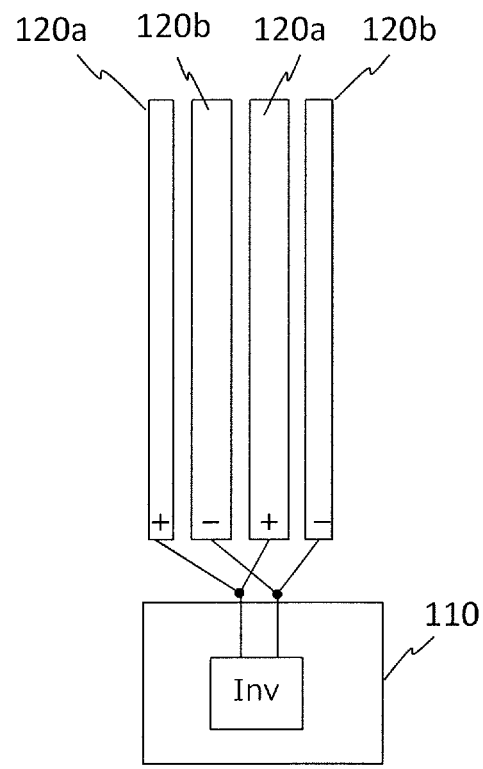
FIG. 13A is a top view schematically showing an example of a configuration in which power transmitting electrodes 120a and 120b located at opposite sides have a smaller width than that of power transmitting electrodes 120a and 120b located on the inner side.
Figure 13B:
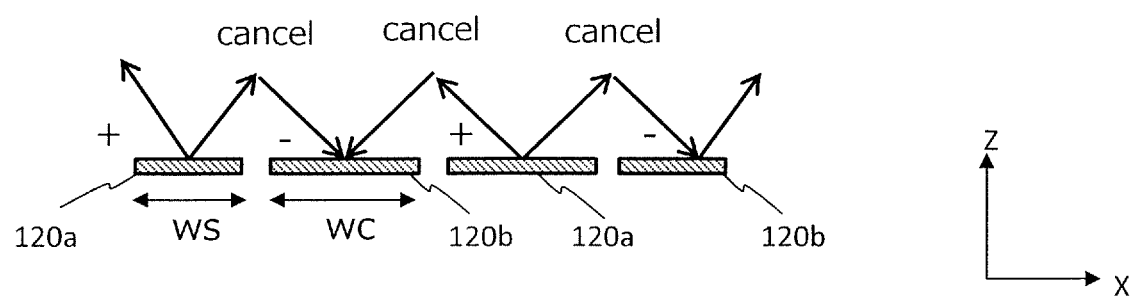
FIG. 13B is a cross-sectional view schematically showing an example of an electric field produced from a group of power transmitting electrodes of the configuration shown in FIG. 13A.

FIG. 13A is a top view schematically showing an example of a configuration in which the power transmitting electrodes 120a and 120b located at opposite sides have a smaller width than that of power transmitting electrodes 120a and 120b located on the inner side, FIG. 13B is a cross-sectional view schematically showing an example of an electric field produced from the group of power transmitting electrodes of this configuration. The configuration of FIG. 13A and FIG. 13B is a configuration in which the two power transmitting electrodes 120a and 120b on the opposite sides of the configuration of FIG. 8A have a smaller width. As the width ws of the outer two power transmitting electrodes is smaller than the width wc of the inner two power transmitting electrodes, it is possible to reduce the leakage electric field around the outer two power transmitting electrodes.

Figure 14A:
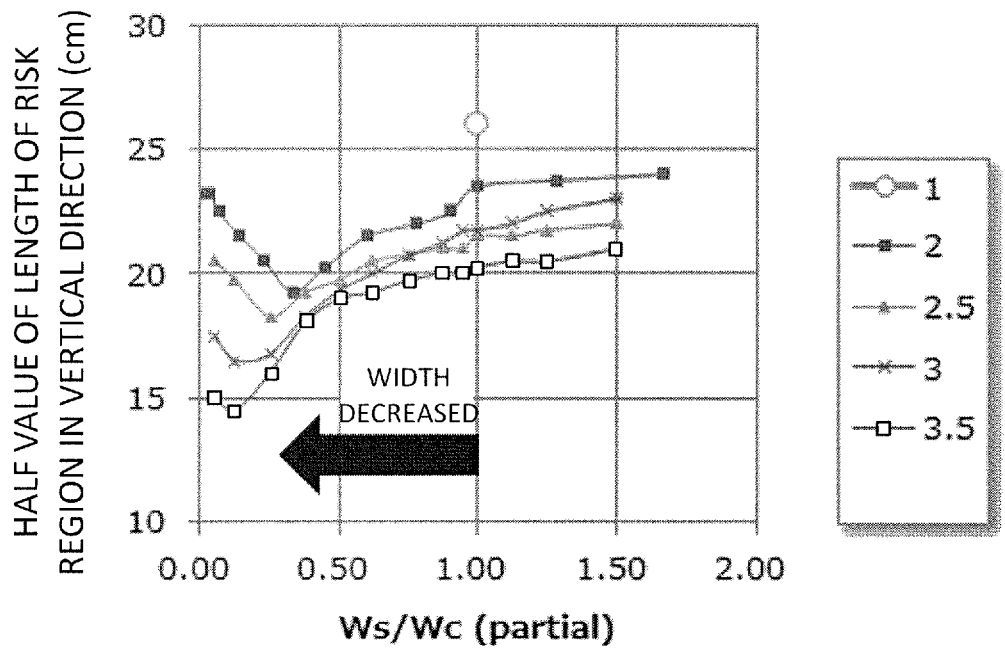
FIG. 14A is a graph showing the change of the size of the risk region with respect to the ws/wc ratio.
Figure 14B:
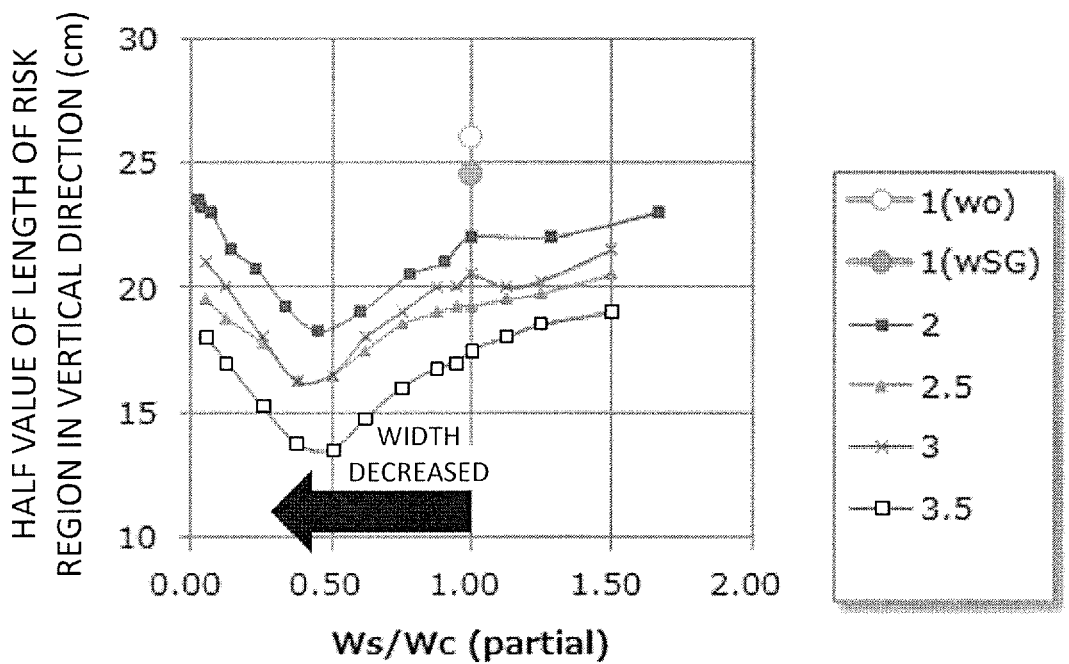
FIG. 14B is another graph showing the change of the size of the risk region with respect to the ws/wc ratio.

FIG. 14A and FIG. 14B each show the change of the size of the risk region with respect, to the ws/wc ratio. FIG. 14A shows the analysis result where third electrodes (referred to also as side grounds: SG) are absent. FIG. 14B shows the analysis result where third electrodes are arranged on opposite sides of the group of power transmitting electrodes. The analyses shown in FIG. 14A and FIG. 14B were conducted for five different configurations of Nd=1, Nd=2, Nd=2.5, Nd=3 and Nd=3.5. For reference, with the configuration of Nd=1, FIG. 14B also plots the result for the case (wo) in which third electrodes on opposite sides are absent as well as the result for the case (wSG) in which there are third electrodes on opposite sides.

As can be seen from FIG. 14A and FIG. 14B, there is a tendency that the risk region where the leakage electric field intensity is high can be reduced by decreasing ws. Note however that when third electrodes are arranged, the effect also tends to be reduced when the ws/wc ratio is set to be too small. In view of these results, when ws/wc is greater than 1, the widths of the electrodes can be designed so as to satisfy $0.05 \leq ws/wc \leq 0.9$, for example. The effect is more pronounced if $0.1 \leq ws/wc \leq 0.6$ is satisfied. Note that, particularly when ws is set to be smaller than wc, the number of electrode divisions may not be equal between the power transmitting electrode unit and the power receiving electrode unit. As described, above, reducing the width of the electrodes at opposite sides of the electrode unit tends to increase the effect of suppressing the risk of the electric field leakage. However, in view of the possibility of positional misalignment of the vehicle with the power transmitting device, the reduction in the width of the electrodes at opposite sides may be disadvantageous for realizing a stably high coupling capacity between the power transmitting electrode unit and the power receiving electrode unit. In such a case, the number of electrode divisions may be deliberately varied between the power transmitting electrode unit and the power receiving electrode unit, and the electrodes may be designed with appropriate widths. Then, it is possible to increase the tolerance for the positional misalignment of the vehicle with the power transmitting device.

Figure 15:
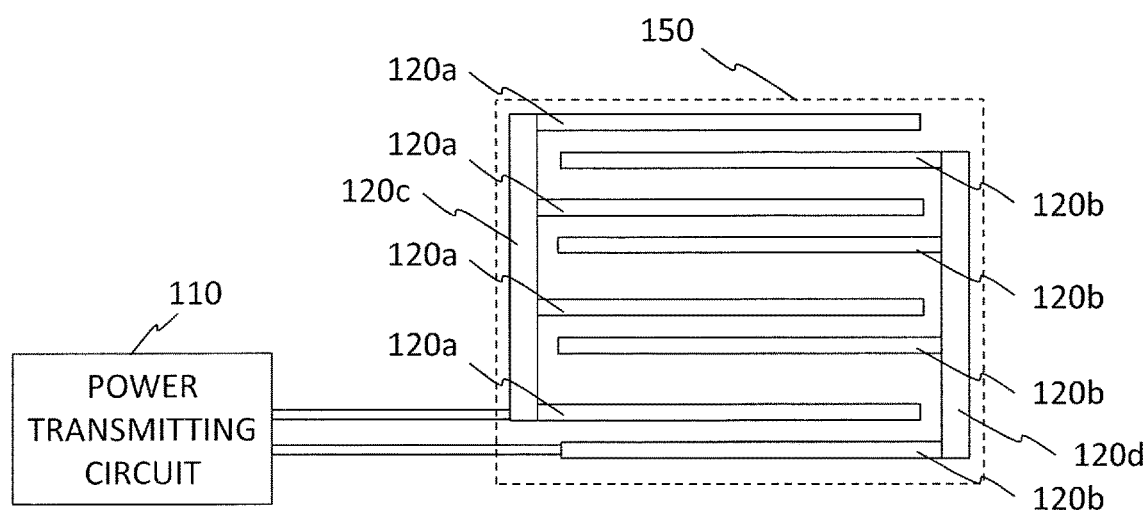
FIG. 15 is a diagram schematically showing another embodiment.

FIG. 15 is a diagram schematically showing another variation of the present embodiment. The power transmitting electrode unit 150 in this example includes four first power-transmitting electrodes 120a and four second power transmitting electrodes 120b. That is, in this example, Nd=4. These electrodes are arranged alternating with each other in the vertical direction (first direction) of FIG. 15, and the electrodes extend in the second direction that is orthogonal to the first, direction. Note that it is only required that the second direction and the first direction be crossing each other, and they do not need, to be orthogonal to each other.

In the example shown in FIG. 15, the plurality of first power transmitting electrodes 120a are electrically connected together via a first conductive line 120c on one side (the left side in FIG. 15) in the second direction of the first power transmitting electrode 120a. On the other hand, the plurality of second power transmitting electrodes 120b are connected together via a second conductive line 120d on the other side (the right side in FIG. 15) in the second direction of the second power transmitting electrode 120b. The plurality of first power transmitting electrodes 120a are connected to one terminal of the power transmitting circuit 110 via the first conductive line 120c. The plurality of second power transmitting electrodes 120b are connected to the other terminal of the power transmitting circuit 110 via the second conductive line 120d. With such a configuration, it is possible to avoid crossing between the first conductive line 120c, to which the plurality of first power transmitting electrodes 120a are connected, and the second conductive line 120d, to which the plurality of second power transmitting electrodes 120b are connected. Thus, the power transmitting electrode unit 150 can be easily arranged inside the power transmitting device.

Next, the configuration of the wireless power transmission system of the present embodiment that relates to power transmission will be described in greater detail. Note that the configuration of the system to be described below is an example, and may be changed as necessary depending on the function and performance required.

Figure 16:
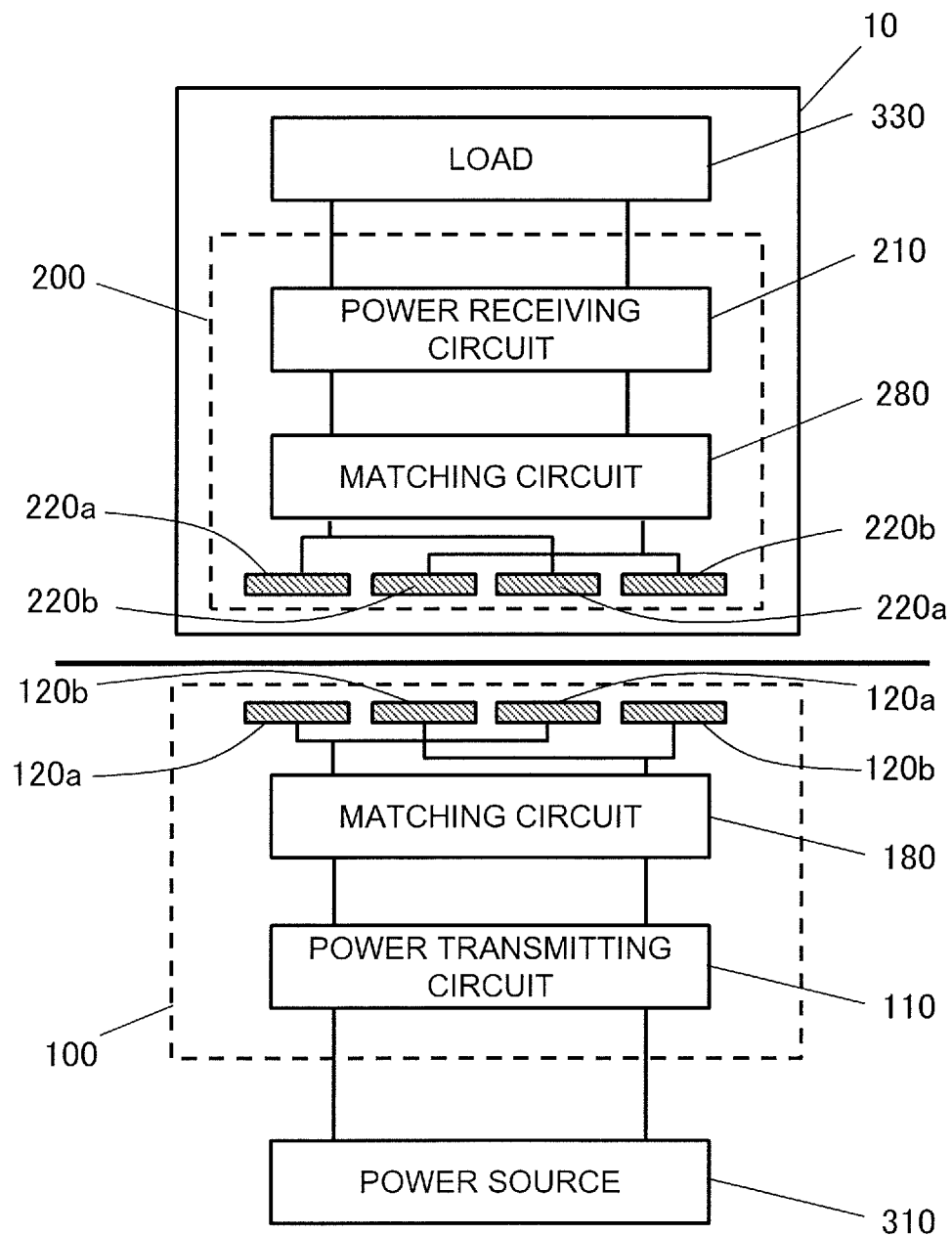
FIG. 16 is a block diagram generally showing a configuration that relaxes to power transmission of the wireless power transmission system.

FIG. 16 is a block diagram generally showing the configuration of the wireless power transmission system of the present embodiment that relates to power transmission. The power transmitting device 100 includes the power transmitting circuit 110 for converting electric power supplied from an external power supply 310 to AC power for power transmission, the two first power transmitting electrodes 120a and the two second power transmitting electrodes 120b for transmitting AC power, and a matching circuit 180 connected between the power transmitting circuit 110 and the power transmitting electrodes 120a and 120b. In the present, embodiment, the power transmitting circuit 110 is electrically connected to the first and second power transmitting electrodes 120a and 120b via the matching circuit 180 therebetween, and outputs AC power to the first and second power transmitting electrodes 120a and 120b. The transport robot 10 includes a power receiving device 200 and the load 330.

The power receiving device 200 includes two first power receiving electrodes 220a and two second power receiving electrodes 220b to be capacitively coupled respectively to the two first power transmitting electrodes 120a and the two second power transmitting electrodes 120b to receive electric power, a matching circuit 280 connected to the power receiving electrodes 220a and 220b, and the power receiving circuit 210 connected to the matching circuit 280 for converting the received AC power to DC power and outputting the DC power. The two first power receiving electrodes 220a form a capacitive coupling with the two first power transmitting electrodes 120a when the two first power receiving electrodes 220a oppose the two first power transmitting electrodes 120a. The two second power receiving electrodes 220b form a capacitive coupling with the two second power transmitting electrodes 120b when the two second power receiving electrodes 220b oppose the two second power transmitting electrodes 120b. AC power is contactlessly transmitted from the power transmitting device 100 to the power receiving device 200 via these four capacitive couplings.

There is no particular limitation on the sizes of the housing of the transport robot 10, the power transmitting electrodes 120a and 120b and the power receiving electrodes 220a and 220b in the present embodiment, and they may be set to the following values, for example. The lengths (the sixes in the Y direction) of the power transmitting electrodes 120a and 120b may be set within a range of 50 cm to 20 m, for example. The widths (the sizes in the X direction) of the power transmitting electrodes 120a and 120b may be set within a range of 0.5 cm to 1 m, for example. When the third electrode 520 is arranged on the side of at least one of the group of power transmitting electrodes and the group of power receiving electrodes, the width of the third electrode 520 may be set within a range of 0.5 mm to 200 mm, for example. The size of the housing of the transport robot 10 in the direction of travel and that in the transverse direction may each be set within a range of 20 cm to 5 m, for example. The lengths (the sizes in the direction of travel) of the power receiving electrodes 220a and 220b may be set within a range of 5 cm to 2 m, for example. The widths (the sizes in the transverse direction) of the power receiving electrodes 220a and 220b may be set within a rage of 2 cm to 2 m, for example. The gap between power transmitting electrodes and the gap between power receiving electrodes may be set within a range of 1 mm to 40 cm, for example. Note however that the present disclosure is not limited to these numerical ranges.

The load 330 may include a driving electric motor, a capacitor for storing electricity or a secondary battery. The load 330 is driven or charged by the DC power output from the power receiving circuit 210.

The electric motor may be any motor such as a DC motor, a permanent magnet synchronous motor, an induction motor, a stepper motor and a reluctance motor. The motor rotates the wheels of the transport robot 10 via shafts, gears, etc., to move the transport robot 10. Depending on the type of the motor, the power receiving circuit 210 may include various types of circuits such as a rectifier circuit, an inverter circuit and an inverter control circuit. In order to drive an AC motor, the power receiving circuit 210 may include a converter circuit for directly converting the frequency (transmission frequency) of the received energy (electric power) to the frequency for driving the motor.

The capacitor may be a high-capacity, low-resistance capacitor such as an electric double layer capacitor or a lithium ion capacitor, for example. By using such a capacitor as a condenser, it is possible to realize faster charging than when a battery (secondary battery) is used. Note that a secondary battery (e.g., a lithium ion battery, etc.) may be used instead of a capacitor. In such a case, more energy can be stored although charging will take longer.

The transport robot 10 drives the motor using the electric power stored in a capacitor or a secondary battery to move around.

As the transport robot 10 moves, the amount of electric power stored in the capacitor or the secondary battery (the charging amount) decreases. Therefore, recharging is needed to keep moving. In view of this, when the charging amount decreases below a predetermined threshold value while moving, the transport robot 10 moves close to the power transmitting device 100 for charging. The power transmitting device 100 may be installed at a plurality of locations in a factory.

Figure 17:
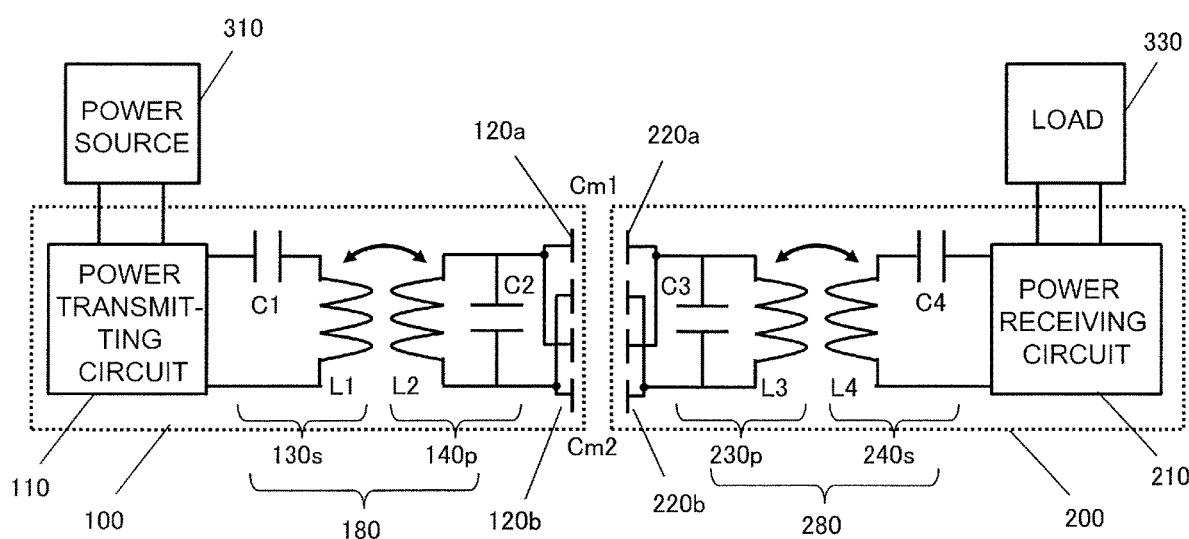
FIG. 17 is a circuit diagram showing a more detailed configuration example of the wireless power transmission system.

FIG. 17 is a circuit diagram showing a more detailed configuration example of the wireless power transmission system. In the illustrated example, the matching circuit 180 of the power transmitting device 100 includes a series resonant circuit 130s that is connected to the power transmitting circuit 110, and a parallel resonant circuit 140p that is connected to the power transmitting electrodes 120a and 120b and inductively coupled to the series resonant circuit 130s. The matching circuit 180 has the function of matching the impedance of the power transmitting circuit 110 with the impedance of the power transmitting electrodes 120a and 120b. The series resonant circuit 130s of the power transmitting device 100 has a configuration in which the first coil L1 and the first capacitor C1 are connected in series with each other. The parallel resonant circuit 140p of the power transmitting device 100 has a configuration in which the second coil L2 and the second capacitor C2 are connected in parallel to each other. The first coil L1 and the second coil L2 are coupled together with a predetermined coupling coefficient to form a transformer. The turns ratio between the first coil L1 and the second coil L2 is set to such a value that an intended transformer ratio (boosting ratio or step-down ratio) is realized.

The matching circuit 280 of the power receiving device 200 includes a parallel resonant circuit 230p that is connected to the power receiving electrodes 220a and 220b, and a series resonant circuit 240s that is connected to the power receiving circuit 210 and inductively coupled to the parallel resonant circuit 230p. The matching circuit 280 has the function of matching the impedance of the power receiving electrodes 220a and 220b with the impedance of the power receiving circuit 210. The parallel resonant circuit 230p has a configuration in which the third coil L3 and the third capacitor C3 are connected in parallel to each other. The series resonant circuit 240s of the power receiving device 200 has a configuration in which the fourth coil L4 and the fourth capacitor C4 are connected in series with each other. The third coil L3 and the fourth coil L4 are coupled together with a predetermined coupling coefficient to form a transformer. The turns ratio between the third coil L3 and the fourth coil L4 is set to such a value that an intended transformer ratio is realized.

Note that the configuration of the matching circuits 180 and 280 is not limited to that shown in FIG. 17, For example, a parallel resonant circuit may be provided instead of each of the series resonant circuits 130s and 240s. A series resonant circuit may be provided instead of each of the parallel resonant circuits 140p and 230p. Moreover, one or both of the matching circuits 180 and 280 may be omitted. When the matching circuit 180 is omitted, the power transmitting circuit 110 and the power transmitting electrodes 120a and 120b are connected directly to each other. When the matching circuit 280 is omitted, the power receiving circuit 210 and the power receiving electrodes 220a and 220b are connected directly to each other. Herein, the configuration in which the matching circuit 180 is provided, falls within the definition of a configuration in which the power transmitting circuit 110 and the power transmitting electrodes 120a and 120b are electrically connected to each other. Similarly, the configuration in which the matching circuit 280 is provided falls within the definition of a configuration in which the power receiving circuit 210 and the power receiving electrodes 220a and 220b are electrically connected to each other.

Figure 18A:
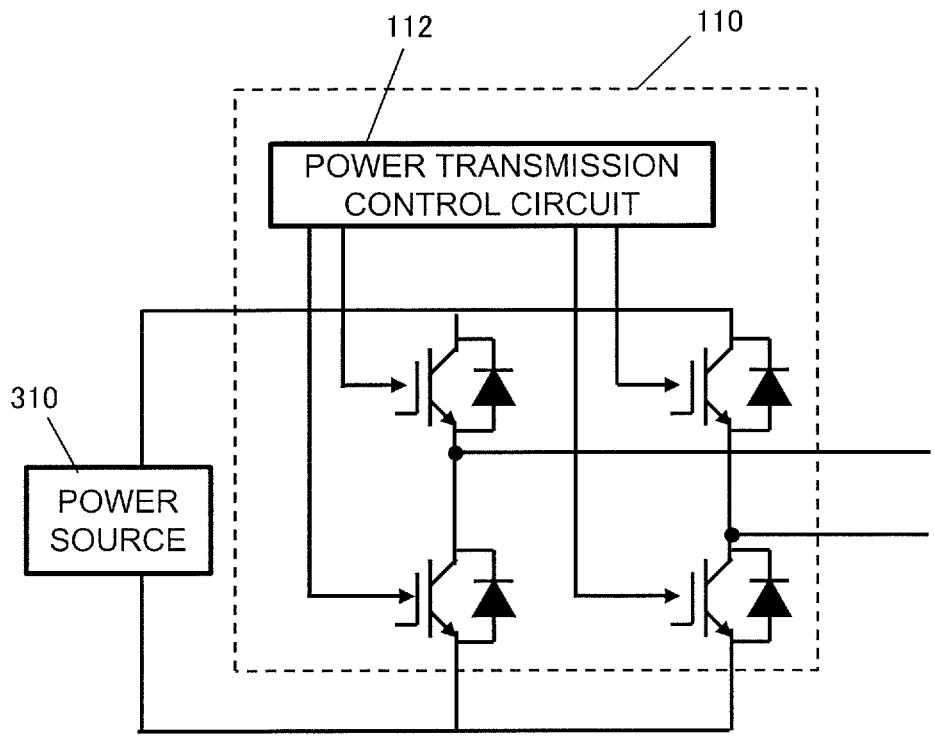
FIG. 18A is a diagram schematically showing a configuration example of a power transmitting circuit 110.

FIG. 18A is a diagram schematically showing a configuration example of the power transmitting circuit 110. In this example, the power transmitting circuit 110 includes a full bridge inverter circuit including four switching elements (e.g., transistors such as IGBTs or MOSFETs), and a control circuit 112. The control circuit 112 includes a gate driver for outputting control signals for controlling ON (conducting) and OFF (non-conducting) of the switching elements, and a processor such as a microcontroller for causing the gate driver to output the control signals. A half bridge inverter circuit or another oscillation circuit such as a class E may be used instead of a full bridge inverter circuit shown in the figure.

The power transmitting circuit 110 may include a communication modem and various sensors for measuring the voltage, the current, etc. When a communication modem is provided, the data can be transmitted to the power receiving device 200 while being superimposed over AC power. When the power supply 310 is an AC power supply, the power transmitting circuit 110 converts the input AC power into another form of AC power having a different frequency or voltage.

Note that the present disclosure includes an embodiment in which a weak AC signal (e.g., a pulse signal) is transmitted to the power receiving device 200 not for the purpose of power transmission but for the purpose of transmitting data. Even in such an embodiment, it can be said that weak electric power is transmitted. Therefore, transmitting a weak AC signal (e.g., a pulse signal) also falls under the concept of "power transmission" or "power transmission". Also, such a weak AC signal falls under the concept of "AC power".

Figure 18B:
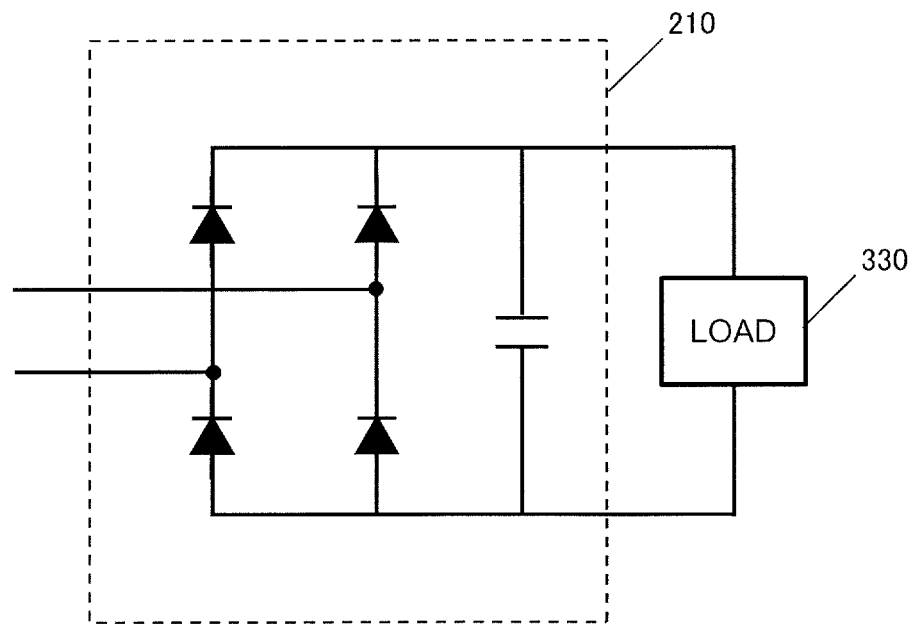
FIG. 18B is a diagram schematically showing a configuration example of a power receiving circuit 210.

FIG. 18B is a diagram schematically showing a configuration example of the power receiving circuit 210. In this example, the power receiving circuit 210 is a full-wave rectifier circuit including a diode bridge and a smoothing capacitor. The power receiving circuit 210 may have another rectifier configuration. In addition to a rectifier circuit, the power receiving circuit 210 may include various circuits such as a constant voltage-constant current control circuit or a communication modem. The power receiving circuit 210 converts the received AC energy into a DC energy that can be used by the load 330. Various sensors for measuring the voltage, the current, etc., output from the series resonant circuit 240s may be included in the power receiving circuit 210.

The coils of the resonant circuits 130s, 140p, 230p and 240s may each be a planar coil or a laminated coil formed on a circuit board, or a wound coil of a copper wire, a litz wire, or a twist wire, for example. The capacitors of the resonant circuits 130s, 140p, 230p and 240s may each be any type of a capacitor that has a chip shape or a lead shape, for example. The capacitance between two wires with the air therebetween may serve as these capacitors. The self-resonance property of each coil may be used instead of these capacitors.

The power supply 310 may be any power supply such as a commercial power supply, a primary battery, a secondary battery, a solar battery, a fuel cell, a USB (Universal Serial Bus) power supply, a high-capacity capacitor (e.g., an electric double layer capacitor), or a voltage converter connected to a commercial power supply, for example. While the power supply 310 is a DC power supply in the present embodiment, it may be an AC power supply.

The resonant frequency f0 of each of the resonant circuits 130s, 140p, 230p and 240s is typically set so as to coincide with the transmission frequency f1 when transmitting power. The resonant frequency f0 of each of the resonant circuits 130s, 140p, 230p and 240s does not need to strictly coincide with the transmission frequency f1. Each resonant frequency f0 may be set to a value that is in the range of about 50% to about 150% of the transmission frequency f1, for example. The frequency f1 of power transmission may be set to 50 Hz to 300 GHz, for example, 20 kHz to 10 GHz in one example, 79 kHz to 20 MHz in another example, and 79 kHz to 14 MHz in still another example.

In the present embodiment, there is a gap between the power transmitting electrodes 120a and 120b and the power receiving electrodes 220a and 220b, and the distance therebetween is relatively long. The distance of the gap may be about 10 mm to about 200 mm, for example, and more preferably about 10 mm to about 30 mm. Therefore, capacitances Cm1 and Cm2 between the electrodes are very small, and the impedance of the power transmitting electrodes 120a and 120b and the power receiving electrodes 220a and 220b is very high (e.g., about several kΩ). In contrast, the impedance of the power transmitting circuit 110 and the power receiving circuit 210 is as low as about several Ω, for example. In the present embodiment, the parallel resonant circuits 140p and 230p are arranged on the side closer to the power transmitting electrodes 120a and 120b and the power receiving electrodes 220a and 220b, respectively, and the series resonant circuits 130s and 240s are arranged on the side closer to the power transmitting circuit 110 and the power receiving circuit 210, respectively. With such a configuration, it is easy to match the impedance. The series resonant circuit whose impedance becomes zero (0) at resonance is suitable for matching with an external circuit having a low input/output impedance. On the other hand, the resonance is suitable for matching with an external circuit having a high input/output impedance. Therefore, it is possible to easily realize an impedance matching by arranging the series resonant circuits at connecting points on the side of the power supply circuit having a low input impedance and arranging the parallel resonant circuits at connecting points on the side of the electrode having a high output impedance, as in the configuration shown in FIG. 15. Similarly, it is possible to desirably realize an impedance matching of the power receiving device 200 by arranging the parallel resonant circuits on the electrode side and arranging the series resonant circuits on the load side.

Note that the impedance of the electrode is low in a configuration in which the distance between the power transmitting electrodes 120a and 120b and the power receiving electrodes 220a and 220b is shortened or a dielectric is arranged, therebetween. In such a case, it is not necessary to employ an asymmetric resonant circuit configuration as described above. When there is no impedance matching issue, the matching circuits 180 and 280 themselves may be omitted.

In the example shown in FIG. 16 and FIG. 17, the group of power transmitting electrodes and the group of power receiving electrodes each include four electrodes, but this is merely an example. The number of electrodes to be included in each of the group of power transmitting electrodes and the group of power receiving electrodes may be changed as needed for different applications.

With the configuration shown in FIG. 18 and FIG. 17, at least one third electrode 520 may be provided in the vicinity of an outermost electrode of at least one of the group of power transmitting electrodes and the group of power receiving electrodes. The third electrode 520 may be arranged inside the power receiving device 200, i.e., inside the transport robot 10, or may be arranged on the outside of the power receiving device 200 or on the outside of the transport robot 10. For example, at least one third electrode 520 may be formed on the outside of the housing of the power receiving device 200.

Note that it is assumed in the above description that the transport robot 10 includes the power receiving device 200 therein, but the transport robot 10 itself may be regarded as being a power receiving device. Moreover, any device that includes an "electrode unit" for receiving power may be called a "power receiving device". Therefore, "the housing of the power receiving device" refers not only to a housing inside the device such as the transport robot 10, but also to a housing of the device itself. At least a portion of the third electrode may be arranged on the housing of the power receiving device.

Embodiment 2

Next, an embodiment in which the transport robot 10 includes an electronic device will be described.

Various electronic devices may be installed on the transport robot 10. For example, a sensor for detecting a movable object therearound such as a human, an animal or another vehicle may be installed. Alternatively, an electronic device such as a sensor for reading location detecting marks arranged on the floor surface may be installed.

Figure 19:
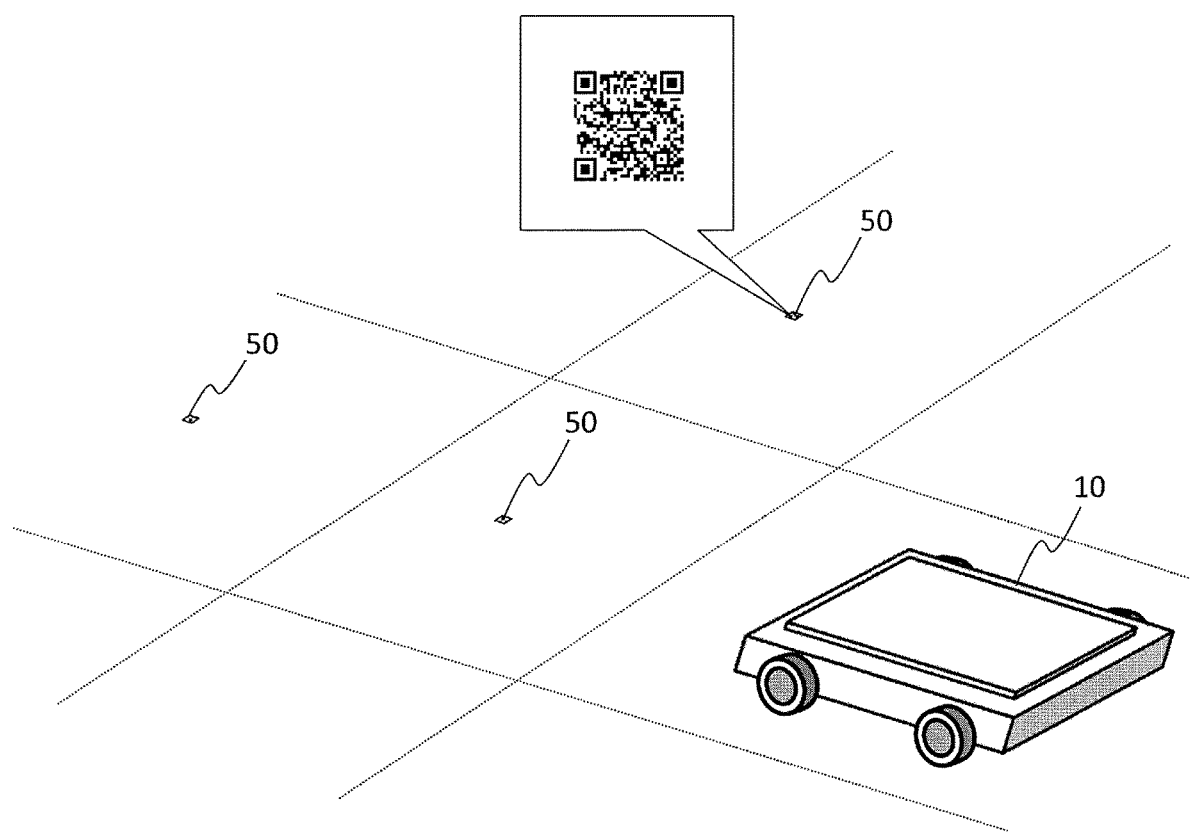
FIG. 19 is a diagram showing an example of a factory where a plurality of location detecting marks are arranged on the floor surface.

FIG. 19 is a diagram showing an example of a factory where a plurality of location detecting marks 50 are arranged on the floor surface. In this example, the mark 50 including a two-dimensional code such as a QR code (registered trademark), for example, is provided at a plurality of locations on the floor surface. The transport robot 10 includes an imaging device (i.e., an image sensor) for reading the mark 50 provided on the bottom surface of the housing. The two-dimensional code of the mark 50 represents the coordinates of the location. By capturing the image of the mark 50 by means of an imaging device, the transport robot 10 obtains location information recorded in the mark 50. Therefore, the transport robot 10 can recognize the location of itself.

While the mark 50 includes a two-dimensional code in this example, it may include a one-dimensional code (e.g., a barcode). Alternatively, an RF tag may be provided instead of the mark 50. In such a case, the transport robot 10 includes an electronic device such as an antenna and a communication device for communicating with the RF tag via radio waves or electromagnetic induction. When an RF tag is used, it is possible to provide more information to the transport robot 10 than when a two-dimensional code is used.

With a mobile system as shown in FIG. 19, the transport robot 10 will pause or slow down at the position of a mark 50 for reading information. It is efficient if power can be transmitted at this point in time. In view of this, the present inventors considered making a mobile system in which power can be transmitted and information can be read at the same time.

Figure 20:
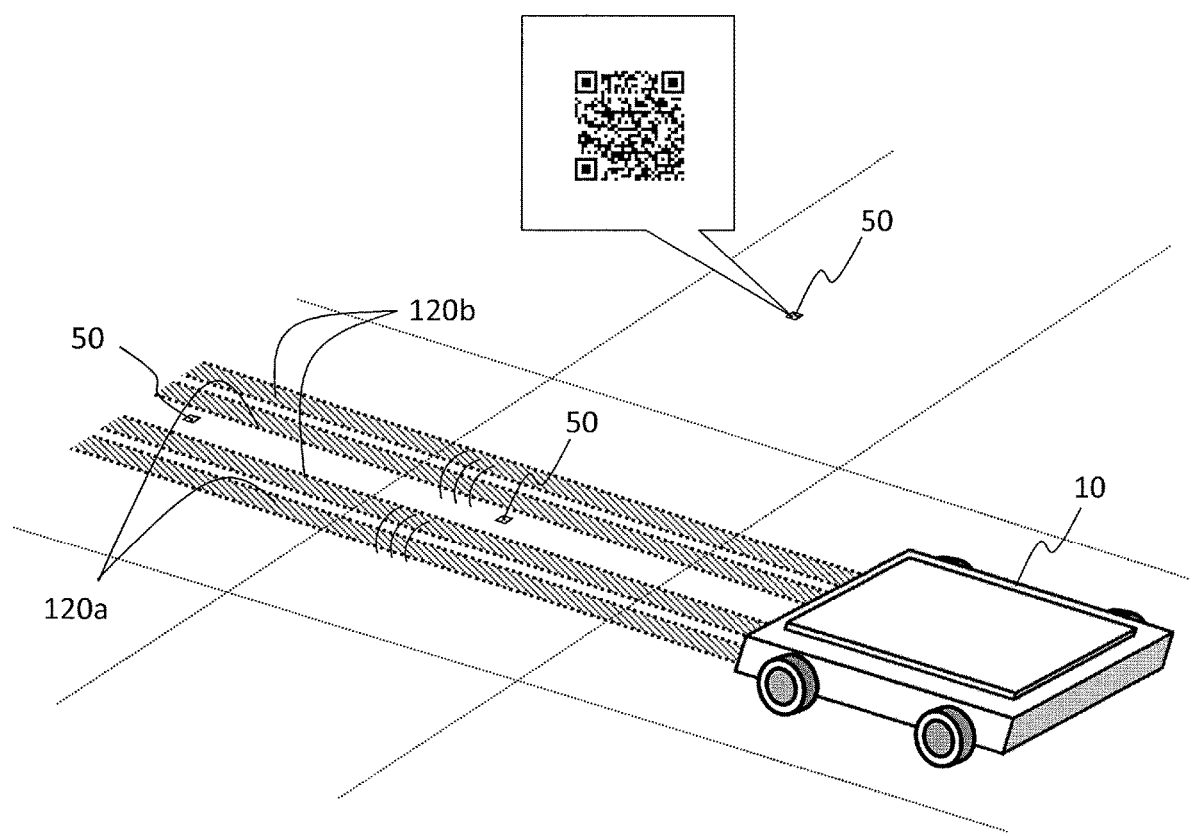
FIG. 20 is a diagram schematically showing an example of a mobile system in which power is transmitted and information is read at the same time.

FIG. 20 is a diagram schematically showing an example of a mobile system in which power is transmitted and information is read at the same time. With this system, a plurality of marks 50 are arranged between two of the four power transmitting electrodes 120 installed on the floor surface that are on the inner side and adjacent to each other. An imaging device is arranged on the bottom surface of the transport robot 10. The imaging device reads information recorded in a mark 50 while electric power is being transmitted from the power transmitting electrodes 120a and 120b to the power receiving electrodes 220a and 220b.

With such a system, when a pair of power transmitting electrodes and a pair of power receiving electrodes are assumedly used as shown in FIG. 2, the influence of the electric field leaking into the imaging device is not negligible. Particularly, when a large amount of electric power is transmitted, a high voltage is applied to the power transmitting electrodes 120a and 120b. Then, the electric field leaking from the power transmitting electrodes 120a and 120b and the power receiving electrodes 220a and 220b into the surrounding space may become strong. As a result, the possibility of affecting the operation of the imaging device cannot be denied.

This problem is not limited to imaging devices, but may similarly occur to other sensing devices. For example, similar problems may occur also when a sensing device such as a human detection sensor, an obstruction detection sensor, an RFID reader, a wireless communication device or an ultrasonic sensor is arranged in the vicinity of the group of power receiving electrodes. Electronic circuits for driving the sensing device described above and for making decisions based on the obtained information may be installed on the electronic device. The interference with these electronic circuits is also a problem.

In the present embodiment, the power transmitting electrodes 120a and 120b and the power receiving electrodes 220a and 220b are each divided into a plurality of portions. The electronic device is arranged between two power receiving electrodes on the inner side as seen from, a direction perpendicular to the electrode installation surface. With such a configuration, it is possible to suppress the influence of the electric field leaking into the sensing device.

Figure 21:
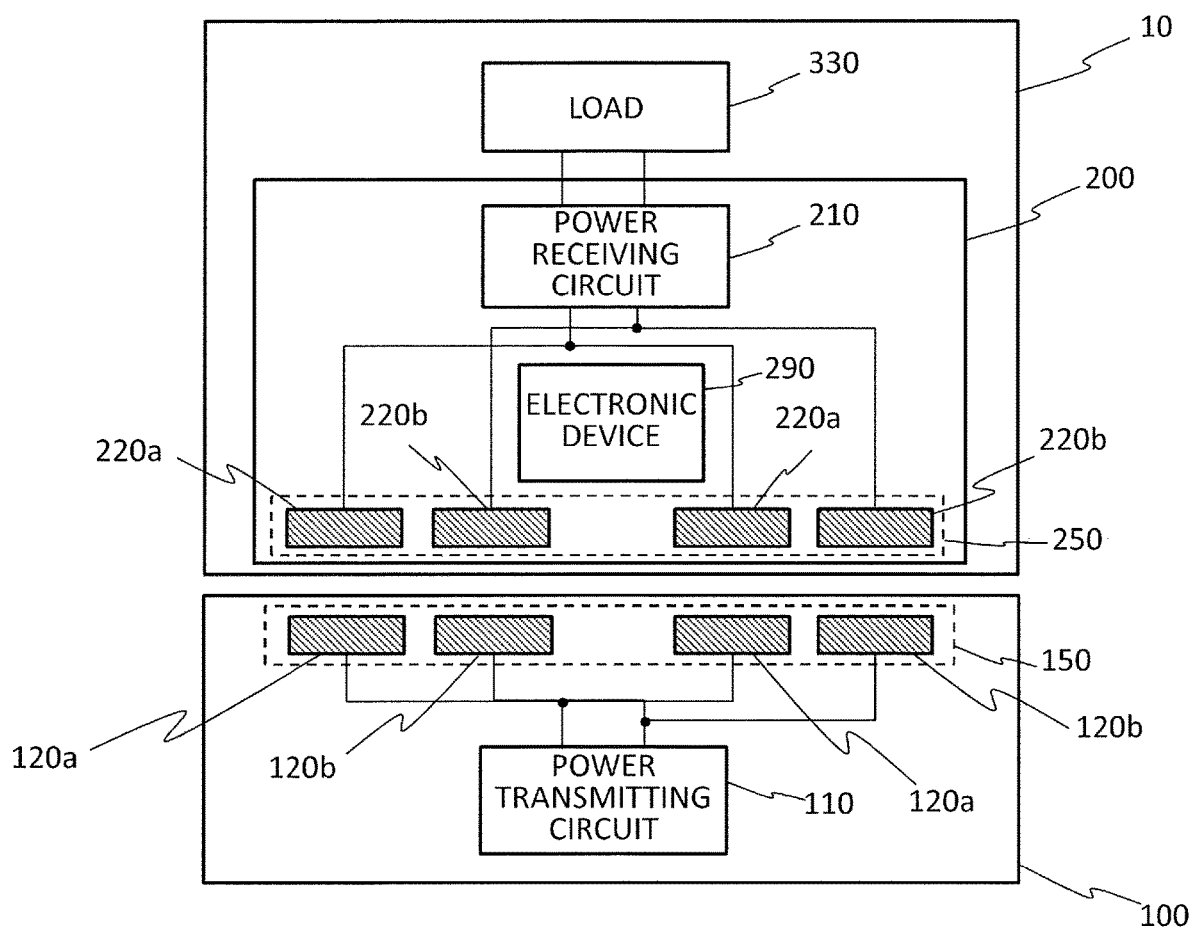

FIG. 21 is a block diagram showing a basic configuration of a system according to the present embodiment. In the present embodiment, in addition to the elements shown in FIG. 5, the power receiving device 200 of the transport robot 10 includes an electronic device 290 for reading information recorded in the mark 50. For each of the group of power transmitting electrodes and the group of power receiving electrodes, the interval between two electrodes on the inner side is greater than the interval between two electrodes on the outer side. Otherwise, the configuration is similar to that shown in FIG. 5.

Figure 22A:
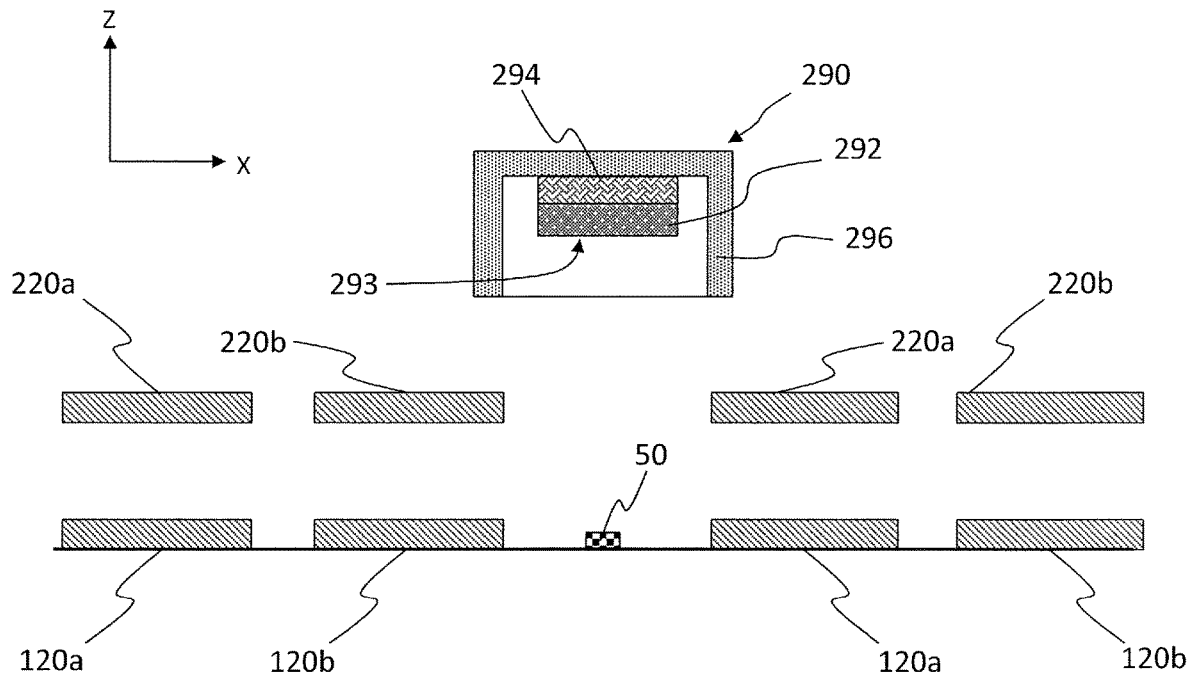
FIG. 22A is a cross-sectional view schematically showing an example of a configuration and an arrangement of a system having an electronic device.

FIG. 22A is a cross-sectional view schematically showing an example of a configuration and an arrangement of the electronic device 290. The electronic device 290 of the present embodiment includes an imaging device 292, a control circuit 294 for controlling the imaging device 292, and a conductive member 296 for accommodating an imaging device 292 and the control circuit 294. Although not shown in FIG. 22A, an electronic: device 290 may include an optical system such as a lens for forming an image on a light-receiving surface 293 of the imaging device 292.

The conductive member 296 includes a bottom portion supporting the control circuit 294 and the imaging device 292, and a tubular side portion. The conductive member 296 may be made of a normal conductive material that is not light-transmissive. The conductive member 296 surrounds the imaging device 292 and the control circuit 294.

In the present embodiment, the power transmitting electrodes 120a and 120b and the power receiving electrodes 220a and 220b have planar surfaces, and are substantially parallel to the floor surface. The four power transmitting electrodes 120a and 120b are arranged on the floor surface. The four power receiving electrodes 220a and 220b are located on the same plane that is substantially parallel to the floor surface. The mark 50, which is a sensing object, is located between two of the four power transmitting electrodes 120a and 120b that are on the inner side and adjacent to each other.

As seen from a direction perpendicular to the electrodes, the center of the light-receiving surface 293 of the imaging device 292 is aligned with the gap between two of the four power receiving electrodes 220a and 220b that are on the inner side and adjacent to each other. That is, the imaging device 292 is arranged so that the light-receiving surface 293 thereof faces the floor surface without opposing any of the power receiving electrodes 220a and 220b. The X coordinate of the center of the light-receiving surface 293 may coincide with, or may be slightly shifted from, the X coordinate of the center of the gap between two of the four power receiving electrodes 220a and 220b that are on the inner side and adjacent to each other. A transparent member may be located between the light-receiving surface 293 and the floor surface.

When the imaging device 292 captures the image of a mark 50, light enters the light-receiving surface 293 of the imaging device 292 from a mark 50 that is being observed. On the other hand, the leakage electric field, produced around the electrodes because of the power transmission, is reduced also by the third electrode 520 in addition to the advantageous effects from electrode division. Therefore, it is possible to reduce the influence of electromagnetic noise on the imaging device 292. In the present, embodiment, since the conductive member 296 is arranged, it is possible to further reduce the influence of electromagnetic noise on the imaging device 292.

Note that a transparent conductive member may be located between the light-receiving surface 293 of the imaging device 292 and the floor surface. When such a transparent conductive member is provided, it is possible to further suppress the leakage electric field from the electrodes.

The transparent conductive member is made of a material that is light-transmissive (i.e., that allows visible light to pass therethrough) and conductive. For (indium tin oxide), IZO (indium zinc oxide) or PEDOT:PSS (a mixture of polythiophene and polystyrenesulfonic acid) may be used.

The conductive member 296 may be formed from a common conductor that is not light-transmissive. For example, any conductive material such as aluminum, iron, copper or an alloy may be used. Note that, the conductive member 296 may also be made of a transparent conductive material.

In response to an instruction from the control circuit 294, the imaging device 292 captures the image of the mark 50 and generates image data. From the generated image data, the control circuit 294 reads a two-dimensional code and obtains information such as the location indicated by the code. The obtained location information can be sent to a controller (not shown), for example, and used for controlling the travel of the transport robot 10.

Figure 22B:
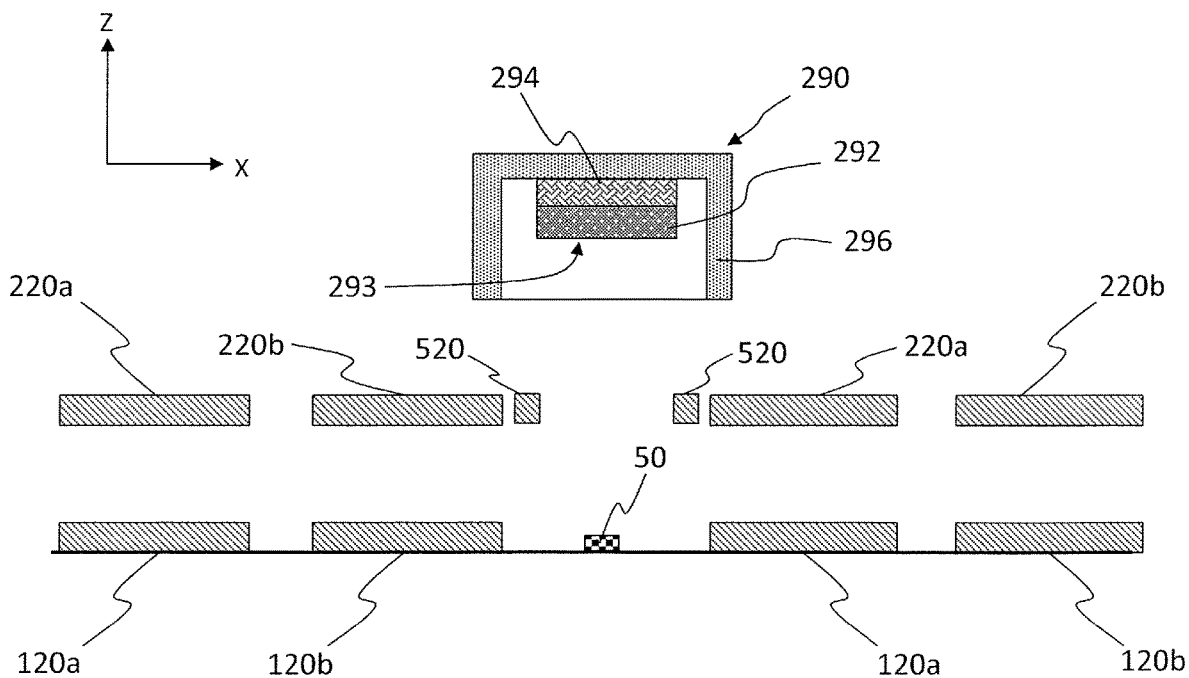
FIG. 22B is a cross-sectional view schematically shelving another example of a configuration and an arrangement of a system having an electronic device.

FIG. 22B is a diagram showing another example of a wireless power transmission system including the electronic device 290. In this example, the two third electrodes 520 are arranged between the inner two electrodes 220a and 220b of the four power receiving electrodes 220a and 220b.

With such a configuration, in addition to the electric field suppressing effect from, electrode division, the suppressing effect from the third electrode 520 can also be realized. Therefore, it is possible to further suppress the influence of electromagnetic noise on the electronic device 290.

While the mark 50, which is a sensing object, is arranged between two of the four power transmitting electrodes 120a and 120b that are on the inner side and adjacent to each other in the examples shown in FIG. 22A and FIG. 22B. The mark 50 may be arranged at any other position. For example, the mark 50 may be arranged between any two adjacent power transmitting electrodes of the group of power transmitting electrodes. Depending on the position of the mark 50, the position of the electronic device 290 is adjusted appropriately. The mark 50 may be arranged on any of the power transmitting electrodes 120a and 120b.

Figure 23:
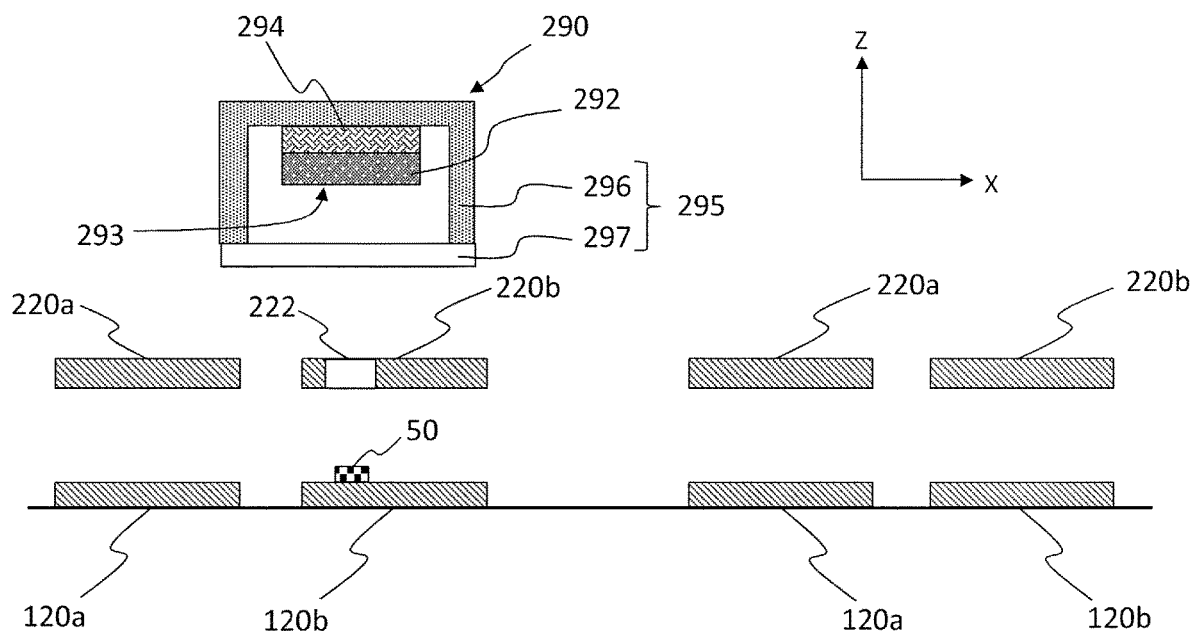
FIG. 23 is a block diagram showing a basic configuration of a system according to Embodiment 2 of the present disclosure.
Figure 24A:
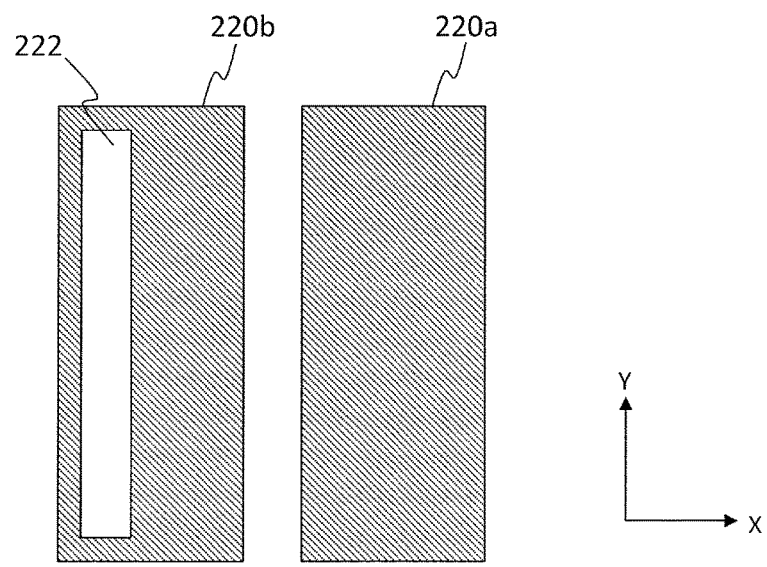
FIG. 24A is a diagram showing an example of a configuration of a transparent region of a power receiving electrode.

FIG. 23 is a cross-sectional view showing an example in which the mark 50 is arranged on one of the power transmitting electrodes 120b. FIG. 24A is a diagram showing two of the four power receiving electrodes 220a and 220b of FIG. 23 as seen from a direction perpendicular to the surface of the power receiving electrodes 220a and 220b. In this example, the power receiving electrode 220b that opposes the power transmitting electrode 120b on which the mark 50 is arranged includes a transparent region 222. With the plurality of power receiving electrodes 220a and 220b opposing the plurality of power transmitting electrodes 120a and 120b, respectively, the transparent region 222 is located directly above the mark 50. The light-receiving surface 293 of the imaging device 292 is located so as to receive light from the mark 50 having passed through the transparent region 222.

The electronic device 290 shown in FIG. 23 includes a blocking member 295, which includes the conductive member 296 and a transparent conductive material 297. The conductive member 296 includes a bottom portion supporting the control circuit 294 and the imaging device 292, and a tubular side portion. The transparent conductive material 297 has a plate-like, membrane-like or film-like structure. The transparent conductive material 297 may be called a transparent conductive plate, a transparent conductive membrane, or a transparent conductive film. The transparent conductive material 297 is bonded to the conductive member 296. The transparent conductive material 297 and the conductive member 296 surround, the imaging device 292 and the control circuit 294.

When the imaging device 292 captures the image of the mark 50, the transparent conductive material 297 is located on the path of light traveling from the mark 50 that is being observed toward the light-receiving surface 293 of the imaging device 292. Therefore, light passes through the transparent conductive material 297 to enter the imaging device 292. On the other hand, the leakage electric field around the electrodes caused by power transmission is blocked by the third electrode 520, the transparent conductive material 297 and the conductive member 296. Therefore, it is possible to reduce the influence of electromagnetic noise caused by power transmission.

The transparent region 222 may be a hole or a transparent conductive member, for example. The transparent region 222 can be formed by cutting out a part of the power receiving electrode 220b. The transparent region 222 may be formed by cutting out a part of the power receiving electrode 220b and filling the hole with a transparent conductive material. The shape and size of the transparent region 222 may be set to any shape and size as long as light from the mark 50 enters the imaging device 292. For example, as shown in FIG. 24B, a plurality of transparent, regions 222 may be arranged in line in the Y direction. The entire power receiving electrode 220b may be formed from a transparent conductive material.

A conductor having one or more apertures (referred to herein as a "shield") may be provided instead of the transparent conductive material 297. The shield may be connected to the ground (i.e., grounded). The size and arrangement of the apertures in the shield are set so as to allow light from the mark 50, which is a sensing object, to pass therethrough while blocking the leak electromagnetic field caused by power transmission.

Figure 25:
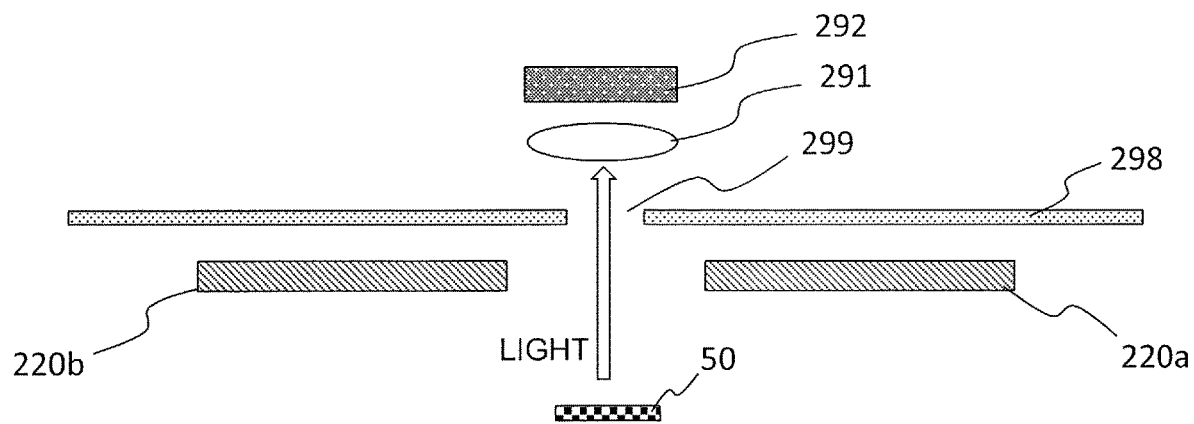
FIG. 25 is a diagram showing an example of a configuration in which a blocking member includes a shield having an aperture therein.

FIG. 25 is a cross-sectional view schematically showing a configuration example in which the blocking member 295 includes a shield 298 having one aperture 239. The shield 298 is formed from a conductive material. The aperture 299 is located on the path of light traveling from the mark 50 to the imaging device 292. Light from the mark 50 passes through the aperture 299 and a lens 291 to be detected by the imaging device 292. Note that FIG. 25 does not show power receiving electrodes other than the two power receiving electrodes 220a and 220b, of the group of power receiving electrodes, that are located in the middle.

The diameter of the aperture 299 is set so as to allow light from the mark 50 to pass therethrough while blocking the leakage electric field around the power receiving electrodes 220a and 220b. Specifically, the diameter of the aperture 299 may be set to a value that is less than half the wavelength of the electromagnetic waves having a frequency used for transmitting electric power without affecting the imaging by the imaging device 292. Herein, the "diameter" of the aperture 299 means the size of the aperture 299 in one of all the directions that are parallel to the surface of the shield 298 in which the size of the aperture 299 is greatest. For example, when the shape of the aperture 299 as seen from above is quadrilateral, the diameter of the aperture 299 is the length of the longer one of the diagonals. When the shape of the aperture 299 is an ellipse, the diameter of the aperture 299 is the length of the longer axis.

When the frequency used for transmitting electric power (hereinafter referred to as the "transmission frequency") is 500 MHz, for example, the wavelength in the air of the electromagnetic waves having the frequency is about 60 cm. Therefore, in such a case, the diameter of the aperture 299 may be set to be less than 30 cm. The diameter of the aperture 239 is set to an appropriate value for the transmission frequency. The smaller the size of the aperture 299, the lower the intensity of the electromagnetic waves passing through the aperture 299. Therefore, the size of the aperture 299 is set so that it is possible to block the electromagnetic waves of the transmission frequency while ensuring an area needed for light used for imaging to pass therethrough.

In the example shown in FIG. 25, the shield 298 may be implemented by the housing of the electronic device 290 or the transport robot 10. The shield 298 may have a plurality of apertures therein.

Figure 26:
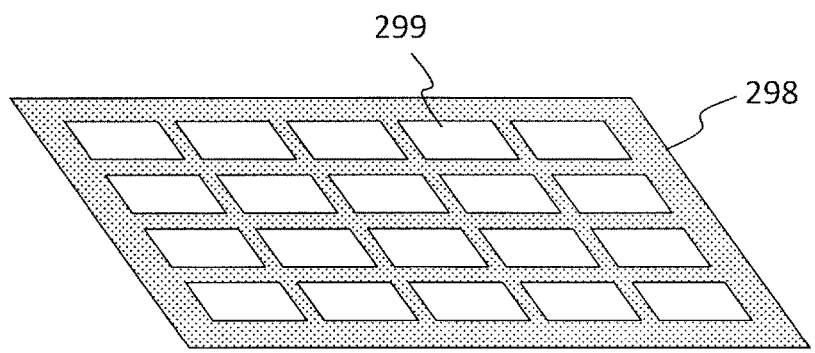
FIG. 26 is a diagram showing another example of a shield.

FIG. 26 is a diagram showing another example of the shield 298. In this example, the shield 298 has a plurality of apertures 299 therein. The apertures 299 are arranged in a two-dimensional array. The apertures 299 may be arranged in a one-dimensional array. The apertures 299 do not need to all have the same shape and the same size. The diameter of each aperture 299 may be set to such a value that light from the sensing object is allowed to pass therethrough while blocking the electromagnetic waves of the transmission frequency.

The configuration using the shield 298 may be used for applications in which information is obtained from a sensing object using electromagnetic waves other than light. For example, it may be applied to a system in which an RF-ID or a wireless LAN is used for communication. Furthermore, it may be applied to a configuration in which the shield 298 is used for a sensor using an ultrasonic device.

As an example, assume a case where the transmission frequency is 500 kHz. With an RF-ID, if electromagnetic waves in the 900 MHz band are used, for example, these frequency bands are higher than the transmission frequency. Also with a wireless LAN, if electromagnetic waves in the 2.4 GHz band or the 5 GHz band are used, for example, these frequency bands are higher than the transmission frequency. Therefore, with a shield having a plurality of apertures therein, it is possible to allow electromagnetic waves for communication to pass therethrough while suppressing electromagnetic noise caused by power transmission.

Similarly, with a sensing device using an ultrasonic device, it is possible to suppress the influence of electromagnetic noise by using a shield that blocks electromagnetic waves caused by power transmission while allowing ultrasonic waves pass therethrough.

With any of the configurations, the size of each aperture of the shield 298 may be set so as to allow electromagnetic waves or sound waves used for sensing to pass therethrough without exposing the antenna or the sound wave source to the electromagnetic waves of the transmission frequency.

Figure 27:
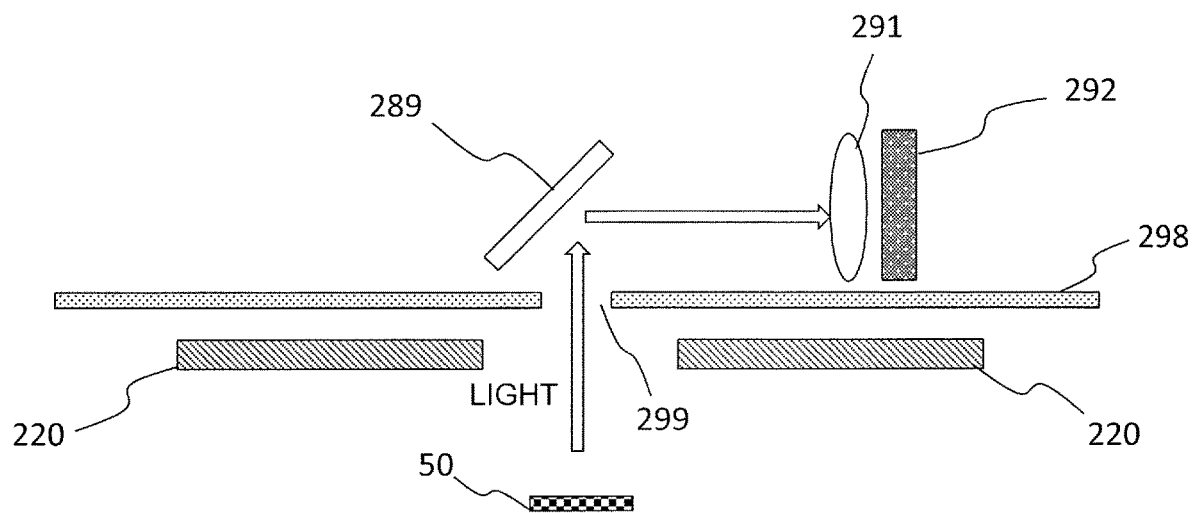
FIG. 27 is a diagram showing a variation of the configuration shown in FIG. 25.
Figure 28:
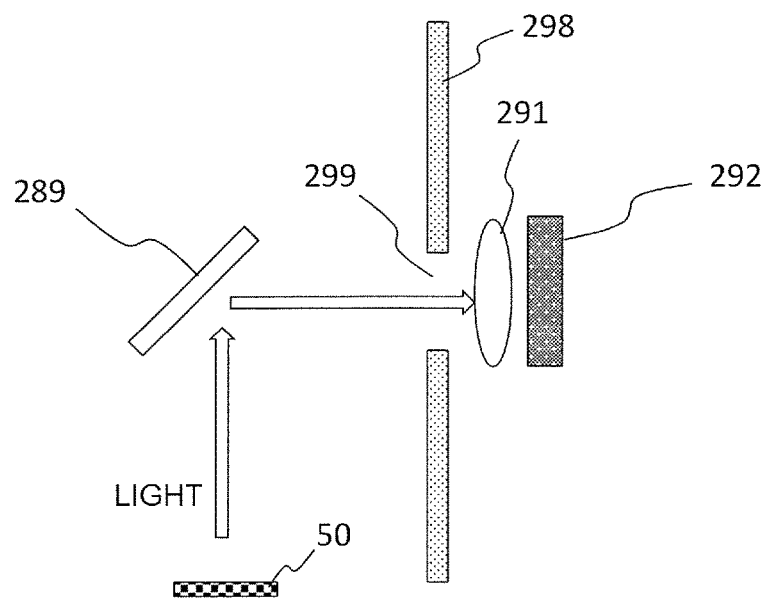
FIG. 28 is a diagram showing another variation of the configuration shown in FIG. 25.

FIG. 27 is a diagram showing a variation of the configuration shown in FIG. 25. In this variation, the electronic device includes a mirror 289 that reflects light from the mark 50 onto the imaging device 292. As shown in the figure, the path of the light or electromagnetic waves from an object, is not limited to a straight line, but the path may be altered by a reflector such as the mirror 289. In this example, a transparent conductive member may be arranged instead of the shield 238 having the aperture 299, FIG. 28 is a diagram showing another variation of the configuration shown in FIG. 25. In this variation, the shield 298 having the aperture 299 is arranged between the mirror 289 and the imaging device 292. Thus, the position of the aperture 299 of the shield 298 may be any position as long as it is on the path of light traveling from the mark 50 onto the imaging device 292. Also in this example, a transparent conductive member may be arranged instead of the shield 298 having the aperture 299.

The configuration shown in FIG. 27 and the configuration shown in FIG. 28 may be combined together. For example, a first blocking member may be arranged between the sensing object and the reflector, and a second blocking member may be arranged between the reflector and the sensing device. Also in a configuration in which no reflector is provided, two or more blocking members may be provided in series with each other. With such a configuration, it is possible to further reduce the influence of electromagnetic noise caused by power transmission.

Next, an example of a vehicle that senses an object different from the mark 50 will be described.

Figure 29:
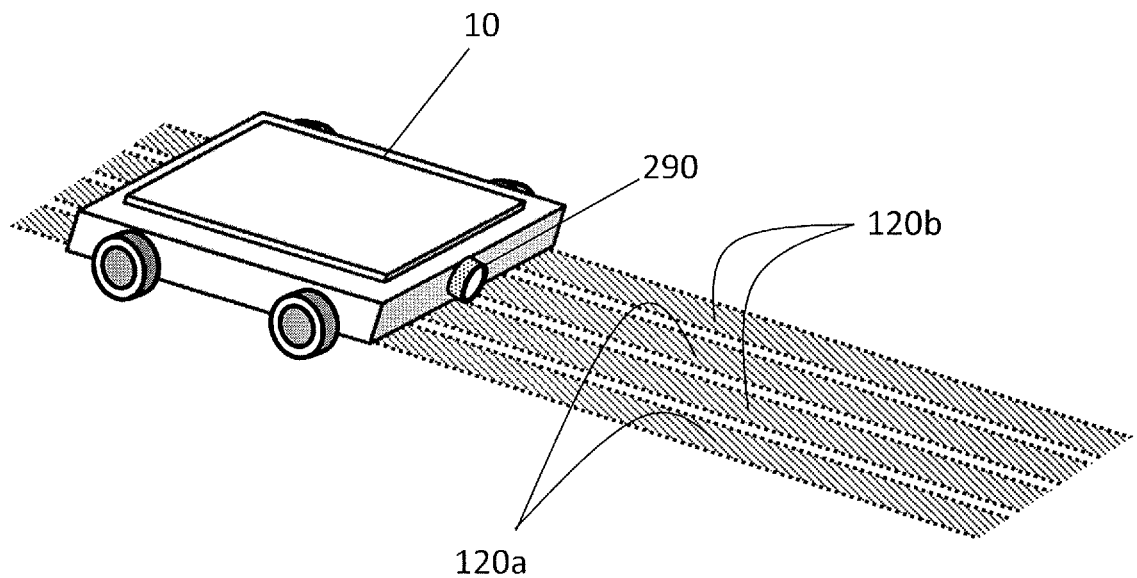
FIG. 29 is a diagram showing an example of a vehicle including a sensor for detecting humans.
Figure 30:
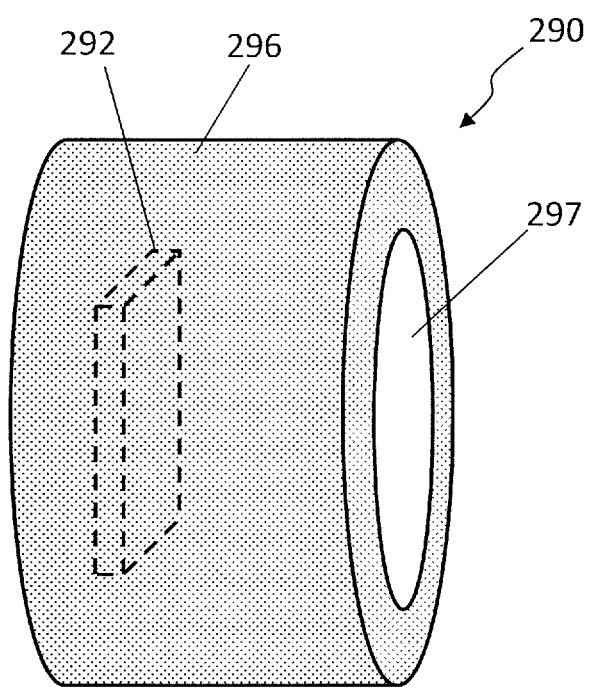
FIG. 30 is a diagram showing a general configuration of a sensor.

FIG. 29 is a diagram showing an example of the transport robot 10 including a sensor for detecting humans. The transport robot 10 includes the electronic device 290 that functions as a human detection sensor. While the position of the electronic device 290 is on the front of the transport robot 10 in this example, the position of the electronic device 290 may be any position, FIG. 30 is a diagram showing a general configuration of the electronic device 290. The electronic device 290 includes the imaging device 292, which is a sensing device, the conductive member 296, which functions as a housing, and the transparent conductive material 297. An optical system such as a lens may be arranged between the transparent conductive material 297 and the imaging device 292.

In this example, when a human comes into the vicinity of the power transmitting electrodes 120a and 120b while electric power is transmitted, the transport robot 10 detects the human and instructs the power transmitting device to stop or lower the electric power transmission. Since the conductive member 296 and the transparent conductive material 297 are provided, the influence of electromagnetic noise from the electrodes is reduced, thereby improving the human detection precision. At least one third, electrode may be provided in the vicinity of the electronic device 290. With the third electrode, it is possible to further reduce the influence of the electric field generated from the power transmitting electrodes or the power receiving electrodes. When a sufficient electric field suppressing effect is achieved only by dividing the power transmitting electrode and the power receiving electrode into a plurality of portions, the transparent conductive material 297 may be omitted.

Note that the shield having one or more apertures described above may be arranged instead of the transparent conductive material 297. A photodetector of a different type may be arranged instead of the imaging device 292.

In the embodiments described above, the electrodes extend in the same direction in parallel to each other, the present disclosure is not limited to such a structure depending on the application. For example, the electrodes may have a rectangular shape such as a square shape. The technique of the present disclosure can be applied to embodiments in which a plurality of such rectangular electrodes are arranged in one direction. It is not an indispensable condition that the surfaces of all the electrodes be on the same plane. Moreover, the surfaces of the electrodes do not need to have a completely planar shape, but may have a curved surface or a shape with protrusions/depressions, for example. Such a surface also falls within the definition of a "planar surface" as long as it is generally planar. The electrodes may be inclined with respect to the road surface.

In the description set forth above, descriptions regarding the power transmitting electrode unit can directly apply also to the power receiving electrode unit as long as there is no contradiction. Similarly, descriptions regarding the power receiving electrode unit can directly apply also to the power transmitting electrode as long as there is no contradiction.

The wireless power transmission system according to any embodiment of the present disclosure may be used as a system for transporting articles inside a factory, as described above. The transport robot 10 functions as a platform track that has a platform where articles are placed and autonomously moves around inside the factory to carry the articles to intended locations. Note however that the wireless power transmission system and the vehicle of the present disclosure are not limited to such an application, but may be used in various other applications. For example, the vehicle is not limited to an AGV, but may be another industrial machine, a service robot, an electric car, a forklift, a multicopter (drone), an elevator, or the like. For example, the wireless power transmission system, can be used not only in a factory, but also in a shop, in a hospital, in a house, on a road, on a runway, and in any other place.

As described above, the present disclosure includes electrode units, power transmitting devices, power receiving devices, electronic devices, vehicles and wireless power transmission systems as set forth in items below.

[Item 1] An electrode unit for use in a power transmitting device or a power receiving device of a wireless power transmission system based, on an electric field coupling method, the electrode unit including;

a first group of electrodes including a plurality of first electrodes to which a first voltage is applied when power is transmitted; and a second group of electrodes including a plurality of second electrodes to which a second voltage is applied when power is transmitted, wherein the second voltage has a phase that is different from, a phase of the first voltage by a value greater than 90 degrees and less than 270 degrees, wherein:

the plurality of first electrodes and the plurality of second electrodes are arranged in a first direction along an electrode installation surface; and at least two of the plurality of first electrodes and at least two of the plurality of second electrodes are arranged, alternating with each other in the first direction.

[Item 2] The electrode unit according to item 1, wherein the number of first electrodes and the number of second electrodes are equal to each other, or the difference between the number of first electrodes and the number of second electrodes is 1.

[Item 3] The electrode unit according to item 2, wherein all of first electrodes and all of the second electrodes are arranged alternating with each other in the first direction.

[Item 4] The electrode unit according to any one of any one of items 1 to 3, wherein each of the plurality of first electrodes and the plurality of second electrodes extends in a second, direction along the electrode installation surface, the second direction intersecting the first direction.

[Item 5] The electrode unit according to item 4, wherein:

the plurality of first electrodes are electrically connected to each other on a first side thereof in the second direction; and the plurality of second electrodes are electrically connected to each other on a second side thereof, opposite to the first side, in the second direction.

[Item 6] The electrode unit according to any one of items 1 to 5, wherein a total width of the first group of electrodes is equal to a total width of the second group of electrodes.

[Item 7] The electrode unit according to any one of items 1 to 6, further including;

at least one third electrode arranged with a gap from the first and second groups of electrodes, the at least, one third electrode having a third voltage whose amplitude is less than amplitudes of the first and second voltages when power is transmitted, wherein at least a portion of the at least one third electrode is located outside an area that is defined by the first and second groups of electrodes as seen from a direction perpendicular to the electrode installation surface.

[Item 8] The electrode unit according to any one of items 1 to 7, wherein at least one of two electrodes of the first group of electrodes and the second group of electrodes that are located at opposite sides has a width that is smaller than a width of another electrode that is adjacent to the at least one of the two electrodes.

[Item 9] The electrode unit according to any one of items 1 to 8, wherein two electrodes of the first group of electrodes and the second group of electrodes that are located at opposite sides have a width that is smaller than a width of any other electrode.

[Item 10] The electrode unit according to item 9, wherein $0.1 \leq ws/wc \leq 0.6$ is satisfied, where ws is a width of two electrodes of the first group of electrodes and the second group of electrodes that are located at opposite sides, and wc is a width of the other electrodes.

[Item 11] A power transmitting device including;

the electrode unit according to any one of items 1 to 10; and a power transmitting circuit supplying AC power to the first group of electrodes and the second group of electrodes of the electrode unit.

[Item 12] A power receiving device including:

the electrode unit according to any one of items 1 to 10;

a power receiving circuit for converting the AC power received by the first and second electrodes of the electrode unit to DC power or another form of AC power to supply the converted power to a load.

[Item 13] The power receiving device according to item 12, further including an electronic device including a sensing device for obtaining information from a sensing object around the vehicle by using an electromagnetic field or an ultrasonic wave.

[Item 14] The power receiving device according to item 13, wherein the sensing device is located between two electrodes of the first group of electrodes and the second group of electrodes that are adjacent to each other as seen from a direction perpendicular to the electrode installation surface.

[Item 15] The power receiving device according to item 13 or 14, wherein the sensing device obtains the information from the sensing object by using light in a visible range or an infrared range.

[Item 16] The power receiving device according to item 15, wherein the sensing device is an imaging device.

[Item 17] The power receiving device according to item 16, wherein:

the sensing object is a mark including a one-dimensional or a two-dimensional code; and the sensing device captures an image of the mark so as to read information recorded in the code.

[Item 18] The power receiving device according to item 17, wherein:

the code includes location information; and the sensing device reads the code so as to obtain the location information of the code.

[Item 19] The power receiving device according to item 15 or 16, wherein:

the sensing object is a human or another obstruction; and the sensing device detects presence of the human or the other obstruction by using the light.

[Item 20] A vehicle including:

the power receiving device according to any one of items 12 to 19; and a load that is driven by electric power received by the power receiving device.

[Item 21] A wireless power transmission system including the vehicle according to item 20, and the power transmitting device according to item 11.

[Item 22] A wireless power transmission system comprising:

a power transmitting device including a power transmitting electrode unit; and a power receiving device including a power receiving electrode unit, wherein:
each of the power transmitting electrode unit and the power receiving electrode unit is the electrode unit according to any one of items 1 to 10;
the plurality of first electrodes of the power receiving electrode unit oppose the plurality of first electrodes of the power transmitting electrode unit, respectively, when power is transmitted; and
the plurality of second electrodes of the power receiving electrode unit oppose the plurality of second electrodes of the power transmitting electrode unit, respectively, when power is transmitted.

The technique of the present disclosure can be used for any device that is driven by electric power. For example, it can be used for a vehicle such as an electric car (EV), an automated guided vehicle (AGV) or an unmanned aircraft (UAV).

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fail within the true spirit and scope of the invention.

This application is based on Japanese Patent Applications No. 2017-140582 filed on Jul. 20, 2017 and No. 2018-058114 filed on Mar. 26, 2018, the entire contents of which are hereby incorporated by reference.

What is claimed is:

1. An electrode unit for use in a power transmitting device or a power receiving device of a wireless power transmission system based on an electric field coupling method, the wireless transmission system configured to transfer electric power from the power transmitting device to a vehicle that includes the power receiving device and is configured to move along a direction while receiving the power, the electrode unit comprising:
a first group of electrodes including a plurality of first electrodes to which a first voltage is applied when power is transmitted; and
a second group of electrodes including a plurality of second electrodes to which a second voltage is applied when power is transmitted, wherein the second voltage has a phase that is different from a phase of the first voltage by a value greater than 90 degrees and less than 270 degrees, wherein:
the plurality of first electrodes and the plurality of second electrodes are arranged in a first direction along an electrode installation surface;
at least two of the plurality of first electrodes and at least two of the plurality of second electrodes are arranged alternating with each other in the first direction;
each of the plurality of first electrodes and the plurality of second electrodes extends in a second direction along the electrode installation surface, the second direction intersecting the first direction; and
the second direction is as the direction along which the vehicle moves while receiving the power.

2. The electrode unit according to claim 1, wherein:
the plurality of first electrodes are electrically connected to each other on a first side thereof in the second direction; and
the plurality of second electrodes are electrically connected to each other on a second side thereof, opposite to the first side, in the second direction.

3. The electrode unit according to claim 1, further comprising at least one third electrode arranged with a gap from the first and second groups of electrodes, the at least one third electrode having a third voltage whose amplitude is less than amplitudes of the first and second voltages when power is transmitted,
wherein at least a portion of the at least one third electrode is located outside an area that is defined by the first and second groups of electrodes as seen from a direction perpendicular to the electrode installation surface.

4. The electrode unit according to claim 1, wherein at least one of two electrodes of the first group of electrodes and the second group of electrodes that are located at opposite sides has a width that is smaller than a width of another electrode that is adjacent to the at least one of the two electrodes.

5. The electrode unit according to claim 1, wherein two electrodes of the first group of electrodes and the second group of electrodes that are located at opposite sides have a width that is smaller than a width of any other electrode.

6. The electrode unit according to claim 5, wherein 0.1 ws/wc0.6 is satisfied, where ws is a width of two electrodes of the first group of electrodes and the second group of electrodes that are located at opposite sides, and we is a width of the other electrodes.

7. A power transmitting device comprising:
the electrode unit according to claim 1; and
a power transmitting circuit supplying AC power to the first group of electrodes and the second group of electrodes of the electrode unit.

8. A power receiving device comprising:
the electrode unit according to claim 1; and
a power receiving circuit for converting the AC power received by the first and second electrodes of the electrode unit to DC power or another form of AC power to supply the converted power to a load.

9. The power receiving device according to claim 8, further comprising an electronic device including a sensing device for obtaining information from a sensing object around the vehicle by using an electromagnetic field or an ultrasonic wave.

10. The power receiving device according to claim 9, wherein the sensing device is located between two electrodes of the first group of electrodes and the second group of electrodes that are adjacent to each other as seen from a direction perpendicular to the electrode installation surface.

11. A vehicle comprising:
the power receiving device according to claim 8; and
a load that is driven by electric power received by the power receiving device.

12. A wireless power transmission system comprising: a vehicle comprising:
a power receiving device comprising: the electrode unit according to claim 1; and
a power receiving circuit for converting the AC power received by the first and second electrodes of the electrode unit to DC power or another form of AC power to supply the converted power to a load; and a load that is driven by electric power received by the power receiving device; and a power transmitting device comprising: the electrode unit according to claim 1; and a power transmitting circuit supplying AC power to the first group of electrodes and the second group of electrodes of the electrode unit.

13. A wireless power transmission system comprising:
a power transmitting device including a power transmitting electrode unit; and a power receiving device including a power receiving electrode unit, wherein:
each of the power transmitting electrode unit and the power receiving electrode unit is the electrode unit according to claim 1;
the plurality of first electrodes of the power receiving electrode unit oppose the plurality of first electrodes of the power transmitting electrode unit, respectively, when power is transmitted; and
the plurality of second electrodes of the power receiving electrode unit oppose the plurality of second electrodes of the power transmitting electrode unit, respectively, when power is transmitted.

14. A wireless power transmission system based on an electric field coupling method, comprising:
a power transmitting device comprising a power transmitting electrode unit configured to be connected to a power transmitting circuit that includes two terminals for outputting AC power; and
a power receiving device comprising a power receiving electrode unit configured to be connected to a power receiving circuit that includes two terminals for receiving AC power and converts the received AC power to a different type of power,
wherein:
the power transmitting electrode unit comprises
a first group of transmitting electrodes including a plurality of first transmitting electrodes configured to be connected to one of the two terminals of the power transmitting circuit, and
a second group of transmitting electrodes including a plurality of second transmitting electrodes configured to be connected to the other one of the two terminals of the power transmitting circuit;
the first and second group of transmitting electrodes are arranged in a first direction and extend at least partially in parallel with a second direction intersecting the first direction, the first and second directions being along an electrode installation surface;
at least two of the first transmitting electrodes and at least two of the second transmitting electrodes are arranged alternating with each other in the first direction;
the power receiving electrode unit comprises
a first group of receiving electrodes including a plurality of first receiving electrodes configured to be connected to one of the two terminals of the power receiving circuit, and
a second group of receiving electrodes including a plurality of second receiving electrodes configured to be connected to the other one of the two terminals of the power receiving circuit;
the first and second group of receiving electrodes are arranged in a third direction and extend at least partially in parallel with a fourth direction intersecting the third direction, the third and fourth directions being along the electrode installation surface;
at least two of the first receiving electrodes and at least two of the second receiving electrodes are arranged alternating with each other in the third direction;
a length of each of the first and second transmitting electrodes in the second direction is greater than a length of each of the first and second receiving electrodes in the fourth direction and a length of the vehicle in a travelling direction of the vehicle;
the numbers and intervals of the first and second transmitting electrodes correspond to the numbers and intervals of the first and second receiving electrodes, respectively; and
the first receiving electrodes are configured to oppose the first transmitting electrodes, respectively, and the second receiving electrodes are configured to oppose the second transmitting electrodes, respectively, when power is transmitted.

* * * * *